US009928279B2

(12) United States Patent
Kindig

(10) Patent No.: US 9,928,279 B2
(45) Date of Patent: Mar. 27, 2018

(54) MEDIA DEVICE AND USER INTERFACE FOR SELECTING MEDIA

(71) Applicant: Excalibur IP, LLC, New York, NY (US)

(72) Inventor: Bradley De Kindig, San Diego, CA (US)

(73) Assignee: Excalibur IP, LLC, New York, NY (US)

( * ) Notice: Subject to any disclaimer, the term of this patent is extended or adjusted under 35 U.S.C. 154(b) by 758 days.

(21) Appl. No.: 14/145,079

(22) Filed: Dec. 31, 2013

(65) Prior Publication Data
US 2014/0297656 A1 Oct. 2, 2014

Related U.S. Application Data

(63) Continuation of application No. 11/250,358, filed on Oct. 14, 2005, now Pat. No. 9,665,629.

(51) Int. Cl.
G06F 17/30 (2006.01)

(52) U.S. Cl.
CPC .... G06F 17/3053 (2013.01); G06F 17/30023 (2013.01)

(58) Field of Classification Search
USPC .......... 707/609, 687, 705, 790, 791
See application file for complete search history.

(56) References Cited

U.S. PATENT DOCUMENTS

| 5,616,876 A | 4/1997 | Cluts |
| 5,969,283 A | 10/1999 | Looney et al. |
| 6,526,411 B1 | 2/2003 | Ward |
| 6,545,209 B1 | 4/2003 | Flannery et al. |
| 6,748,395 B1 | 6/2004 | Picker et al. |
| 6,794,566 B2 | 9/2004 | Pachet |
| 6,993,532 B1 | 1/2006 | Platt et al. |
| 7,340,455 B2 | 3/2008 | Platt et al. |
| 7,680,824 B2 | 3/2010 | Plastina et al. |
| 2002/0018074 A1 | 2/2002 | Buil et al. |
| 2002/0078029 A1 | 6/2002 | Pachet |
| 2002/0087565 A1 | 7/2002 | Hoekman et al. |

(Continued)

FOREIGN PATENT DOCUMENTS

| CN | 101501629 A | 10/2006 |
| EP | 1215834 | 6/2002 |

(Continued)

OTHER PUBLICATIONS

Kosugi N., et al.: "Music Retrieval By Humming-using Similarity Retrieval Over High Dimensional Feature Vector Space"; Communication, Computers and Signal Processing., 1999 IEEE Pacific Rim Conference on Victoria, BC, Canada Aug. 22-24, 1999, Piscataway, NJ, USA IEEE, US, Aug. 22, 1999; pp. 404-407; 4 Pages.

(Continued)

Primary Examiner — Sana Al Hashemi
(74) Attorney, Agent, or Firm — Berkeley Law & Technology Group, LLC

(57) ABSTRACT

A media device and user interface for selecting media. In one embodiment, the media is selected based upon a desired relationship measure between at least two media files. In another embodiment, the media is selected based upon a skip command control functions.

20 Claims, 20 Drawing Sheets

(56) References Cited

U.S. PATENT DOCUMENTS

| | | | |
|---|---|---|---|
| 2002/0134220 | A1 | 9/2002 | Yamane et al. |
| 2002/0147628 | A1 | 10/2002 | Specter et al. |
| 2002/0148343 | A1 | 10/2002 | Gross |
| 2002/0181711 | A1 | 12/2002 | Logan et al. |
| 2003/0128228 | A1 | 7/2003 | Crow et al. |
| 2003/0205124 | A1 | 11/2003 | Foote et al. |
| 2003/0229537 | A1 | 12/2003 | Dunning et al. |
| 2004/0237759 | A1 | 12/2004 | Bill |
| 2004/0260619 | A1* | 12/2004 | Cherkasova ........... G06Q 10/06 709/231 |
| 2006/0206478 | A1 | 9/2006 | Glaser et al. |
| 2006/0265421 | A1 | 11/2006 | Ranasinghe et al. |
| 2008/0263476 | A1 | 10/2008 | Vignoli et al. |

FOREIGN PATENT DOCUMENTS

| | | |
|---|---|---|
| EP | 1548741 A | 6/2009 |
| KR | 10-0978689 | 8/2010 |

OTHER PUBLICATIONS

Supplementary Search Report (EP 06 82 5981) dated Aug. 27, 2009; 2 Pages.
Pampalk et al, "Dynamic Playlist Generation Based on Skipping Behavior", Sep. 2005, ISMIR.
ISMIR "Welcome" screen showing date of event (Sep. 11-15, 2005).
International Search Report (PCT/US06/40282).
Naoko Kosugi et al. "Music Retrieval by Humming", 1999, IEEE, 0-7803-5582-2/99, pp. 404-407.
U.S. Appl. No. 11/250,358: Transmittal of New Application, dated Oct. 14, 2005, 87 Pages.
U.S. Appl. No. 11/250,358: Pre-Exam Formalities Notice, dated Nov. 7, 2005, 2 Pages.
U.S. Appl. No. 11/250,358: Applicant Response to Pre-Exam Formalities Notice, dated Jan. 6, 2006, 9 Pages.
U.S. Appl. No. 11/250,358: Miscellaneous Incoming Letter, dated Feb. 2, 2007, 19 Pages.
U.S. Appl. No. 11/250,358: Notice of Publication, dated Apr. 19, 2007, 1 Page.
U.S. Appl. No. 11/250,358: Non-Final Rejection, dated Nov. 21, 2007, 25 Pages.
U.S. Appl. No. 11/250,358: Notice of Change of Address Placed in File Wrapper due to EBC Customer Number Update, as Filed on Dec. 19, 2007, 1 Page.
U.S. Appl. No. 11/250,358: Amendment/Req. Reconsideration-After non-Final Reject, dated Feb. 20, 2008, 15 Pages.
U.S. Appl. No. 11/250,358: Terminal Disclaimer Review Decision, dated Mar. 11, 2008, 1 Page.
U.S. Appl. No. 11/250,358: Non-Final Rejection, dated May 17, 2008, 29 Pages.
U.S. Appl. No. 11/250,358: Transmittal Letter, dated Aug. 1, 2008, 2 Pages.
U.S. Appl. No. 11/250,358: Amendment/Req. Reconsideration-After Non-Final Reject, dated Aug. 14, 2008, 16 Pages.
U.S. Appl. No. 11/250,358: Examiner Interview Summary Record (PTOL-413), dated Oct. 17, 2008, 4 Pages.
U.S. Appl. No. 11/250,358: Supplemental Response or Supplemental Amendment, dated Oct. 22, 2008, 10 Pages.
U.S. Appl. No. 11/250,358: Terminal Disclaimer Review Decision, dated Jan. 14, 2009, 1 Page.
U.S. Appl. No. 11/250,358: Final Rejection, dated Jan. 15, 2009, 29 Pages.
U.S. Appl. No. 11/250,358: Request for Continued Examination (RCE), dated Mar. 18, 2009, 17 Pages.
U.S. Appl. No. 11/250,358: Supplemental Response or Supplemental Amendment, dated Apr. 1, 2009, 11 Pages.
U.S. Appl. No. 11/250,358: Examiner Interview Summary Record (PTOL-413), dated Apr. 2, 2009, 4 Pages.
U.S. Appl. No. 11/250,358: Non-Final Rejection, dated May 26, 2009, 24 Pages.
U.S. Appl. No. 11/250,358: Amendment/Req. Reconsideration-After Non-Final Reject, dated Aug. 24, 2009, 16 Pages.
U.S. Appl. No. 11/250,358: Transmittal Letter, dated Oct. 29, 2009, 2 Pages.
U.S. Appl. No. 11/250,358: Final Rejection, dated Nov. 20, 2009, 24 Pages.
U.S. Appl. No. 11/250,358: Request for Continued Examination (RCE), dated Feb. 19, 2010, 11 Pages.
U.S. Appl. No. 11/250,358: Examiner Interview Summary Record (PTOL-413), dated May 27, 2010, 5 Pages.
U.S. Appl. No. 11/250,358: Supplemental Response or Supplemental Amendment, dated Jun. 2, 2010, 3 Pages.
U.S. Appl. No. 11/250,358: Transmittal Letter, dated Jul. 12, 2010, 2 Pages.
U.S. Appl. No. 11/250,358: Non-Final Rejection, dated Aug. 4, 2010, 27 Pages.
U.S. Appl. No. 11/250,358: Transmittal Letter, dated Aug. 17, 2010, 2 Pages.
U.S. Appl. No. 11/250,358: Amendment/Req. Reconsideration-After Non-Final Reject, dated Nov. 4, 2010, 15 Pages.
U.S. Appl. No. 11/250,358: Final Rejection, dated Jan. 20, 2011, 29 Pages.
U.S. Appl. No. 11/250,358: Request for Continued Examination (RCE), dated Apr. 20, 2011, 17 Pages.
U.S. Appl. No. 11/250,358: Non-Final Rejection, dated Jun. 14, 2011, 30 Pages.
U.S. Appl. No. 11/250,358: Amendment/Req. Reconsideration-After Non-Final Reject, dated Oct. 14, 2011, 17 Pages.
U.S. Appl. No. 11/250,358: Applicant Initiated Interview Summary (PTOL-413), dated Oct. 28, 2011, 4 Pages.
U.S. Appl. No. 11/250,358: Supplemental Response or Supplemental Amendment, dated Nov. 7, 2011, 11 Pages.
U.S. Appl. No. 11/250,358: Final Rejection, dated Jan. 26, 2012, 31 Pages.
U.S. Appl. No. 11/250,358: Request for Continued Examination (RCE), dated Apr. 26, 2012, 20 Pages.
U.S. Appl. No. 11/250,358: Assignee Showing of Ownership per 37 CFR 3.73., dated Jun. 29, 2012, 1 Pages.
U.S. Appl. No. 11/250,358: Non-Final Rejection, dated Jun. 6, 2013, 34 Pages.
U.S. Appl. No. 11/250,358: Amendment/Req. Reconsideration-After Non-Final Reject, dated Oct. 7, 2013, 26 Pages.
U.S. Appl. No. 11/250,358: Final Rejection, dated Jan. 14, 2014, 32 Pages.
U.S. Appl. No. 11/250,358: Response After Final Action and Amendments, dated Mar. 13, 2014, 26 pages.
U.S. Appl. No. 11/250,358: Advisory Action and Amendments, dated Mar. 31, 2014, 4 pages.
U.S. Appl. No. 11/250,358: RCE and Amendments, Apr. 14, 2014, 23 pages.
U.S. Appl. No. 11/250,358: Non-Final Rejection and Examiner search, dated Dec. 3, 2014, 46 pages.
U.S. Appl. No. 11/250,358: Req. Reconsideration After Non-Final and Amendments, dated Apr. 3, 2015, 33 pages.
U.S. Appl. No. 11/250,358: Final Rejection and Examiner Search, dated Jul. 15, 2015, 34 pages.
U.S. Appl. No. 11/250,358: Response After Final Action and Amendments, dated Sep. 15, 2015, 28 pages.
U.S. Appl. No. 11/250,358: Advisory Action, dated Oct. 14, 2015, 3 pages.
US App. PCT/US06/40282: RO/101—Request form for new IA—Conventional, dated Oct. 13, 2006, 77 Pages.
US App. PCT/US06/40282: Misc. incoming letter from Applicant—IA as Filed on Dec. 5, 2006, 1 Page.
US App. PCT/US06/40282: Misc. incoming letter from Applicant—IA as Filed on Dec. 6, 2006, 20 Pages.
U.S. Appl. No. 11/250,359: Application as Filed on Oct. 14, 2005, 98 Pages.
U.S. Appl. No. 11/250,359: Pre-Exam Formalities Notice, dated Nov. 7, 2005, 2 Pages.

(56) References Cited

OTHER PUBLICATIONS

U.S. Appl. No. 11/250,359: Application as Filed, Applicant Response to Pre-Exam Formalities Notice, dated Jan. 6, 2006, 9 Pages.
U.S. Appl. No. 11/250,359: Notice of Publication, dated Apr. 19, 2007, 1 Page.
U.S. Appl. No. 11/250,359: Non-Final Office Action, dated Nov. 26, 2007, 37 Pages.
U.S. Appl. No. 11/250,359: Non-Final Office Action Response, dated Feb. 25, 2008, 26 Pages.
U.S. Appl. No. 11/250,359: Terminal Disclaimer as Filed on May 22, 2008, 3 Pages.
U.S. Appl. No. 11/250,359: Examiner Interview Summary Record (PTOL-413), dated May 28, 2008, 3 Pages.
U.S. Appl. No. 11/250,359: Non-Final Office Action, dated Jun. 26, 2008, 49 Pages.
U.S. Appl. No. 11/250,359: Transmittal Letter, dated Aug. 1, 2008, 1 Page.
U.S. Appl. No. 11/250,359:Non-Final Office Action Response, dated Sep. 25, 2008, 24 Pages.
U.S. Appl. No. 11/250,359: Requirement for Restriction/Election, dated Dec. 8, 2008, 33 Pages.
U.S. Appl. No. 11/250,359: Non-Final Office Action Response, dated Mar. 9, 2009, 10 Pages.
U.S. Appl. No. 11/250,359: Supplemental Response or Supplemental Amendment, dated Apr. 1, 2009, 19 Pages.
U.S. Appl. No. 11/250,359: Examiner Interview Summary Record (PTOL-413), dated Apr. 2, 2009, 4 Pages.
U.S. Appl. No. 11/250,359: Final Office Action, dated Jun. 10, 2009, 29 Pages.
U.S. Appl. No. 11/250,359: Request for Continued Examination (RCE), dated Aug. 10, 2009 28 Pages.
U.S. Appl. No. 11/250,359: Non-Final Office Action, dated Oct. 27, 2009, 31 Pages.
U.S. Appl. No. 11/250,359: Non-Final Office Action Response, dated Jan. 10, 2010, 9 Pages.
U.S. Appl. No. 11/250,359: Final Office Action, dated Apr. 27, 2010, 33 Pages.
U.S. Appl. No. 11/250,359: Examiner Interview Summary Record (PTOL-413), dated May 27, 2010, 4 pages.
U.S. Appl. No. 11/250,359: Request for Continued Examination (RCE), dated Jun. 2, 2010, 11 Pages.
U.S. Appl. No. 11/250,359: Non-Final Office Action, dated Aug. 4, 2010, 28 Pages.
U.S. Appl. No. 11/250,359: Non-Final Office Action Response, dated Dec. 1, 2010, 8 Pages.
U.S. Appl. No. 11/250,359: Final Office Action, dated Feb. 16, 2011, 30 Pages.
U.S. Appl. No. 11/250,359: Request for Continued Examination, dated May 13, 2011, 9 Pages.
U.S. Appl. No. 11/250,359: Non-Final Office Action, dated Jun. 9, 2011, 30 Pages.
U.S. Appl. No. 11/250,359: Non-Final Office Action Response, dated Oct. 11, 2011, 9 Pages.
U.S. Appl. No. 11/250,359: Applicant Initiated Interview Summary (PTOL-413), dated Oct. 27, 2011, 4 Pages.
U.S. Appl. No. 11/250,359: Supplemental Response or Supplemental Amendment, dated Nov. 8, 2011, 3 Pages.
U.S. Appl. No. 11/250,359: Terminal Disclaimer Review Decision, dated Dec. 2, 2011, 2 Pages.
U.S. Appl. No. 11/250,359: Final Office Action, dated Feb. 8, 2012, 31 Pages.
U.S. Appl. No. 11/250,359: Request for Continued Examination, dated May 7, 2012, 12 Pages.
U.S. Appl. No. 11/250,359: Non-Final Office Action, dated Jun. 11, 2013, 34 Pages.
U.S. Appl. No. 11/250,359: Non-Final Office Action Response, dated Oct. 11, 2013, 11 Pages.
U.S. Appl. No. 11/250,359: Final Office Action, dated Jan. 14, 2014, 31 Pages.
U.S. Appl. No. 11/250,359: Response after Final Office Action, dated Mar. 13, 2014, 15 Pages.
U.S. Appl. No. 11/250,359: Advisory Action (PTOL-303), Amendment After Final or Under 37CFR 1.312, initialed by the examiner, dated Apr. 2, 2014, 4 pages.
U.S. Appl. No. 11/250,359: Request for Continued Examination, dated Apr. 14, 2014, 13 Pages.
U.S. Appl. No. 11/250,359: Non-Final Rejection and Examiner Search, dated Dec. 3, 2014, 47 pages.
U.S. Appl. No. 11/250,359: Req. Reconsideration After Non-Final Rejection and Amendments, dated Apr. 3, 2015, 45 pages.
U.S. Appl. No. 11/250,359: Final Rejection and Examiner search, dated Jul. 15, 2015, 39 pages.
US App. PCT/US06/40282: Initial Publication, dated Apr. 26, 2007.
US App. PCT/US06/40282: IPRP, dated Apr. 7, 2009.
US App. PCT/US06/40282: Written Opinion of International Search Authority, dated Apr. 3, 2009.
CN 200680047209/101501629A: First Office Action Rejection Decision, dated Mar. 11, 2010, 33 pages.
U.S. Appl. No. 11/250,358: RCE and Amendments, dated Nov. 11, 2015.
U.S. Appl. No. 11/250,359: Abandonment, dated Feb. 11, 2016, 2 pages.

\* cited by examiner

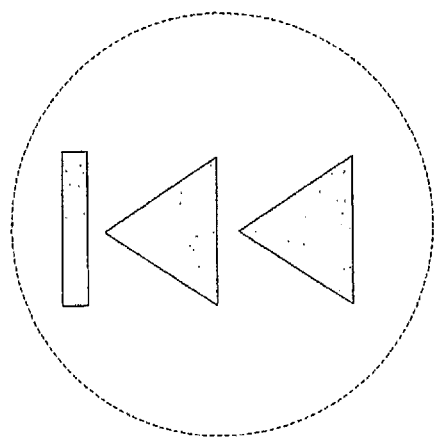
Fig. 20a
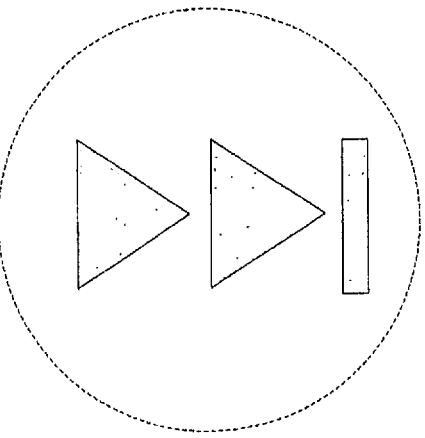
Fig. 20b
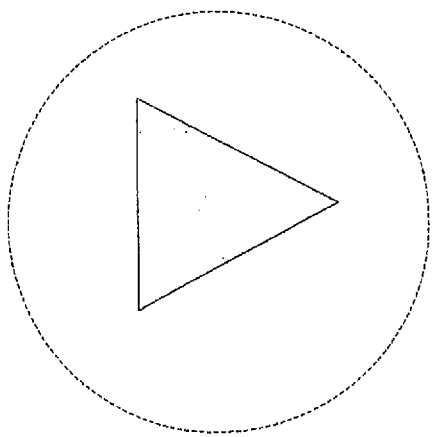
Fig. 20c
FIG. 20

MEDIA DEVICE AND USER INTERFACE FOR SELECTING MEDIA

This application is a continuation of U.S. patent application Ser. No. 11/250,358, entitled "Media Device and User Interface for Selecting Media", filed Oct. 14, 2005.

FIELD OF THE INVENTION

The present disclosure pertains to a media device and user interface for selecting media. In one embodiment, the media is selected based upon a desired relationship measure between at least two media files. In another embodiment, the media is selected based upon a skip command control functions.

BACKGROUND OF THE PRESENT DISCLOSURE

The advent of digital audio compression technologies such as MP3, combined with inexpensive devices capable of storing ever-increasing amounts of data, have led to revolutionary new ways to manage and access music collections and media files. Digital Media Players or Media Jukeboxes pioneered by Musicmatch, Real Networks, Yahoo! and others allowed users to copy their music collections from Compact Disc and Vinyl record albums to compressed digital audio formats stored on computer hard-drives.

Once stored in this format, the jukebox software allows the user to catalog and organize their media files and music collections. More importantly, advances in software allow the user unprecedented control over the playback of the recordings. Tracks can be played in any order with virtually no delay required to retrieve the track. The 'random access' across an entire music collection allowed users to create ordered lists of tracks in advance of playback and to skip, pause, replay, shuffle or otherwise edit the order of the playlist during playback itself.

The introduction of cheaper computer memory (RAM) led to the creation of relatively low-capacity portable music players with some of these same capabilities.

More recently, the introduction of cheaper, smaller, and relatively sturdy mass storage devices has led to a new generation of portable devices with storage capacity for thousands of songs. An entire music collection can now fit in a pocket, purse, or car audio system.

However, portable media devices often have limited resources for user interfaces. Displays are generally small because the devices themselves are small. Input devices such as button controls, and choosing devices are simple. Pointing devices and keyboards are rare or unpractical. The portable device must opt for a simple user interface to ensure that the device is portable, cost-effective, easy to use, and sturdy enough to survive its intended environment.

Portable media players are designed to operate in environments that not only challenge the ability of the device to operate, but that also challenge the user to operate the device. Increasingly, portable media players are being used in automobiles. Joggers and those operating exercise equipment also commonly use portables.

With limited display and user input capabilities, the task of manipulating playlists and choosing an artist, album, or track from hundreds or thousands of choices can become burdensome. With regard to media player appliances in an automobile, when the user is operating the automobile, the task of selecting then next audio recording becomes downright dangerous. The user is forced to become passive and listen only to pre-programmed or random playlists.

Personal computer based media players have undergone a transition that can put the user in a similar predicament. Personal computer based media players are now often driving home entertainment systems consisting of component audio amplifiers and speakers. In such an environment, the listening environment may be in a different room from the Personal computer.

'Media Center' Personal computers use a simplified user interface displayed on a large format display device such as a television screen.

Such simplified user interfaces designed for viewing from a distance are often called '10 foot UIs' referring to the typical distance of the user from the display. As with portables, the power to manipulate playlists and interact with the music based on mood or situation is reduced and the user is likely to be passive.

The 'living room' listening environment also may discourage the user from interacting with the music selection process. If the personal computer is remote, the user may need to walk into another room to access the interface. If the personal computer is a media center personal computer, the display must be on and switched appropriately and the interface devices (wireless remote, mouse, keyboard) accessible.

SUMMARY OF THE PRESENT DISCLOSURE

In a general embodiment, a media device is disclosed. In one embodiment, comprises data that indicates a relationship measure among a plurality of media files; a user interface comprising a user input element; a first element operative to receive user input indicative of a desired relationship measure and a desire to identify a second media file of the plurality; a second element operative to identify a first media file of the plurality; and a third element operative to identify a second media file in accordance with the desired relationship measure and the identity of the first media file. In one embodiment, the data is created autonomously by the media device. In another embodiment, the data is received from a remote database. In one embodiment, the data is received from a remote media device.

In one embodiment, the media device further comprises a fourth element operative to play the second media file. In one embodiment, the media device further comprises a communication element for communicating with a remote database. In one embodiment, the communication is for synchronizing the data among the media device and the remote database.

The data may be based on various types of information. For example, the data may be based upon a statistical measure of co-occurrence of a particular set of media files of the plurality of media files, established by analyzing the playback history of users of the plurality of media files, established by analyzing the playlists constructed by users of the plurality of media files, based upon explicit user preferences, based observed user behavior, established by human judgments in which the human judgments may or may not comprise of a categorization of the media files.

In another embodiment, the media files are represented by geometric vectors and the data is based on geometric comparisons of the vectors. In a further embodiment, the geometric comparison is a dot product operation. In one embodiment, the geometric comparison is a calculation of distance between the vectors. In one embodiment, the data is stored as a graph with the media files associated to vertexes of the graph and edges of the graph represent relationships between the media files. In one embodiment, these edges contain weights corresponding to the strength of the relationships. In another embodiment, the data is established by analyzing waveforms of the plurality of media files. In another embodiment, the data is established by analyzing a statistical measure of a co-occurrence of the plurality of media files in published documents. In another embodiment, the data is established by a similarity of attributes associated with the plurality of media files. For example, the attribute may comprise categories such as a mood, tempo, and a situation preferences.

In one embodiment, the media device may be a portable media player, a personal computer-based media player, a cellular telephone, or a streaming appliance.

In one embodiment, the relationship measure correlates to a medium degree of similarity, relationship measure correlates to a high degree of similarity, or relationship measure correlates to a low degree of similarity.

In one embodiment, the user input comprises at least one selection of at least one component of the input element. In one embodiment, the component may be a key, button, dial, configured to receive a voice command.

In one embodiment, either one or both of the first media file and the second media file is an audio file or a video file.

In a general embodiment, a user interface for a media device is disclosed. In one embodiment, a user interface for a media device comprises a user interactable indicia representing a file identification action from a plurality of media files, the identification being related to the indicia such that interaction with the indicia signals a program that causes a selection of a next media file to be experienced by a user, the program making the selection based upon a desired relationship measure between a first media file and other files of the plurality. In one embodiment, the indicia may comprise a skip icon, a key, a button, a dial.

In one embodiment, a media player having a skip command control function is disclosed. In one embodiment, the media player having a skip command control function comprises a user interface element for receiving a skip command function, wherein the skip command instructs the player to cease playing a currently playing media file and play an alternate media file to be selected from a plurality of media files; storage for retaining data that represents a relationship measure among the plurality of media files wherein the skip command is based upon the relationship measure; and software responsive to the user interface element that selects the alternate media file in accordance with the relationship measure, the currently playing media file, and the skip command.

In an embodiment, a portable media player for the interactive playback of media files comprises storage for media files and relationships between the media files; and software to receive events that trigger a skip of one or more magnitudes and to select the next media file for playback based on the magnitude of the skip, wherein the magnitude of the skip and associations between the current recording and selectable recordings affects the likelihood of selection of one of the media files as the next media file. In a further embodiment, the portable media player further comprises a database system containing information used to identify media files and relationships between media files; and a communications unit in the portable device capable of connecting to one or more computing devices wherein relationships between media files can be transferred to the portable media player from the one or more of the computing devices.

In one embodiment, the player permits the connected computing device to manage the media files stored on the device. In another embodiment, the player further comprises a software module for facilitating connection to a remote database system so that the media player may be connected to the remote database system so that relationship data may be transferred from the remote database system to the computing device.

In one embodiment, the player contains programming to permit the connected computer to manage the media files stored on the device. In one embodiment, the player contains programming to permit the connected compute to transfer the relationship data to the device. In one embodiment, the player further comprises software for connection to a remote database system and wherein the player comprises programming to facilitate connection to the remote database system such that relationship data is transferred from the remote database system to the connected computer.

It is noted that the terms recordings and media files may be used interchangeably in their broadest sense. Thus, in one embodiment, the recordings or media files may be digital audio and/or video files. In further embodiments, the media files or recordings may be music videos, television programs, photos, text documents like RSS feeds, and/or movies.

It is further noted that although the present disclosure refers to media files, all types of files that can be read by automated means to provide a perceptible experience to a user, including but not limited to files such as video and audio, are contemplated as within the scope of the present disclosure.

BRIEF DESCRIPTION OF THE DRAWINGS

The following drawing figures, which form a part of this application, are illustrative of embodiments of the present invention and are not meant to limit the scope of the invention in any manner, which scope shall be based on the claims appended hereto.

FIG. 20 illustrates an icon of an exemplary embodiment.

DETAILED DESCRIPTION OF PREFERRED EMBODIMENTS

Figure 1:
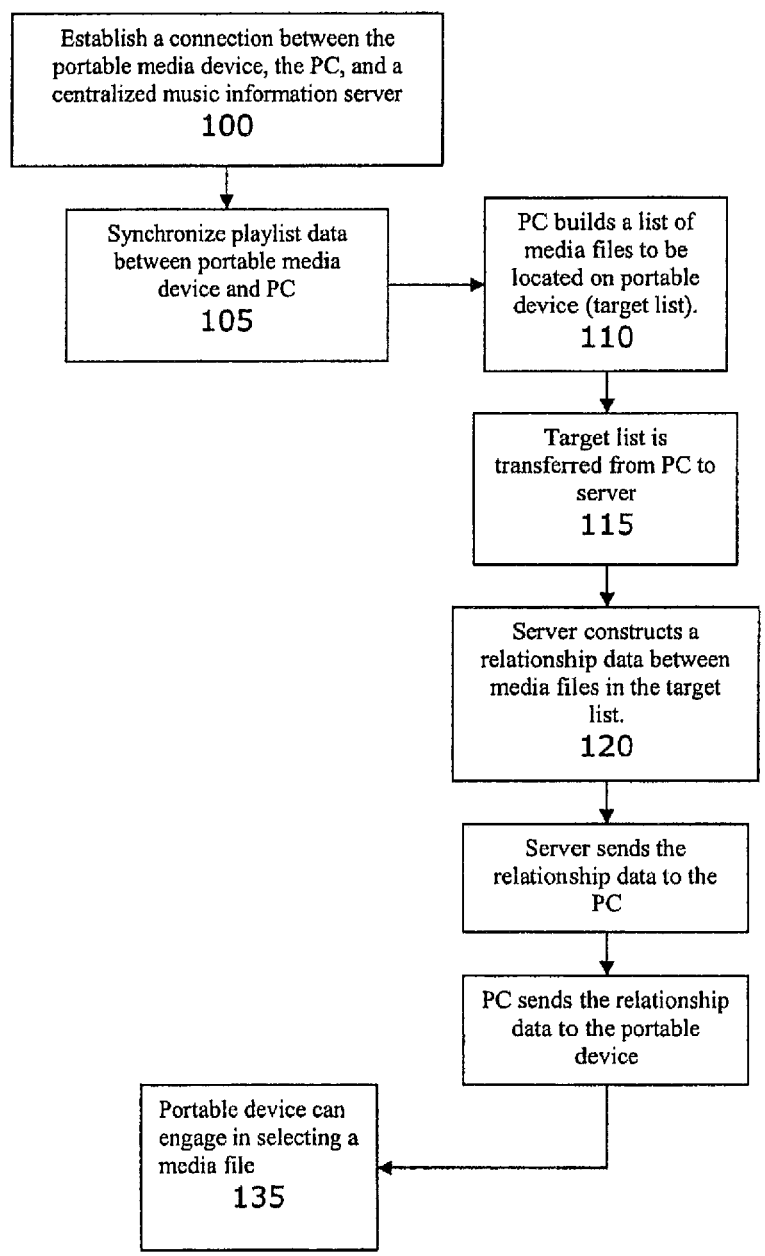
FIG. 1 is a flowchart illustrating an exemplary method of creating and/or loading relationship data onto a portable device.

Several exemplary embodiments of the present disclosure will now be discussed with reference to the aforementioned figures, wherein like reference numerals refer to like components.

In general, the present disclosure relates to a method, media device, system, and user interface for selecting media. In one embodiment, media is selected based on a desired relationship measure, a user input, relationship data, and the identity of a media file on a device. Such devices include but are not limited to, a portable media device, a personal computer-based media player, a media appliance, a streaming media appliance, satellite radio or video receiver, a cellular telephone and/or any other appliance or hardware/software configuration appropriate for converting stored information into a perceptible user experience. Accordingly, each device is supported by a particular system configuration or architecture to facilitate the selection of a media.

In another embodiment of a method of selecting media, the method comprises recognizing the value of at least one attribute of a media file of a plurality of media files; receiving a user input indicative of a desired relationship measure and a desire to select a second media file of said plurality of media files; accessing relationship data that indicates a relationship measure among the values of the at least one attribute of the media files of said plurality of media files; selecting said second attribute value in accordance with said desired relationship measure, said user input, said relationship data, and said first attribute value; and selecting a second media file in accordance with said selected second attribute value.

In one embodiment, the attribute is the principle recording artist of the media file. In another embodiment, the attribute is the genre of the media file or recording. In one embodiment, the media file is a sound recording.

In a further embodiment, the method further comprises biasing the selection of the second media file based on an additional attribute. In one embodiment, the additional attribute is the popularity of the media file. In another embodiment, the additional attribute represents the explicit rating of the media file. In another embodiment, the additional attributes represents the implicit rating of the media file based upon observed user behavior tracked by one or more components of the system (e.g. user track selection, frequency of selection of a track, standard skipping to avoid a track, deletion of track from playlists, etc.).

In another embodiment, each device is supported by a particular system configuration or architecture to also facilitate the creation of the data that indicates a relationship measure among media files.

In one embodiment, when the device stores the data that indicates a relationship measure among a plurality of media files, the user is able to engage in several playback functions with respect to the plurality of media files. These interactive playback functions are described in greater detail later.

Portable Media Device Exemplary Embodiment

Figure 2:
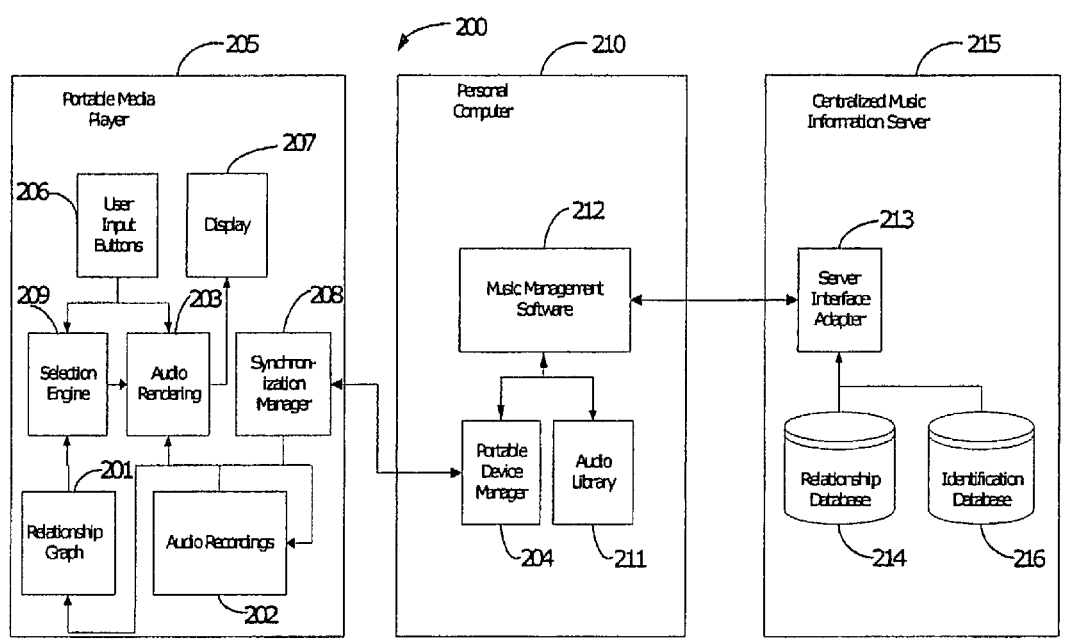
FIG. 2 illustrates an exemplary system configuration or architecture creating and/or loading relationship data onto a portable device.

In one embodiment, as depicted in FIG. 1 and FIG. 2 together, a portable media device or portable media player has the capability to select a media file based on a desired relationship measure, a user input, relationship data, and the identity of a media file. Such portable media player devices include but are not limited to MP3 players such as those known by the trade names APPLE IPOD, CREATIVE LABS ZEN MICRO, DELL DJ, IRIVER H10, RIO CARBON, or cell phones incorporating such functionality, or similar devices capable of storing and/or reproducing media files. FIG. 1 depicts an exemplary method of creating, relationship data and loading the relationship data onto a portable media device. FIG. 2 depicts an exemplary system architecture or configuration for creating and then loading relationship data onto the portable media device. FIG. 2 depicts a portable music player 205 connected to a personal computer 210 which is connected to a centralized music information server 215. The portable music player 205 comprises at least one user input icon such as button 206, an optional display 207, a selection engine 209, audio rendering capabilities 203, a synchronization manager 208, a relationship graph 201 that be based on artist, genre, album or any other type of category, and audio recordings 202. The personal computer 210 comprises a music management software 212, a portable device manager 204, and an audio library 211. The centralized music information server 215 comprises a server interface adapter 213, a relationship database 214, and an identification database 216.

In addition, FIG. 1 depicts an exemplary method for creating and then loading relationship data onto a portable media device. As depicted in FIG. 1, a connection is established 100 between the portable media device, the personal computer, and a centralized music information server. In one embodiment, there may be multiple connections between the portable media device, the personal computer, and the centralized music information server. Such communication connections may be wired or wireless, LAN, WAN, WiFi, cellular, satellite, or other means of establishing communication now known or to become known. In one exemplary embodiment, there may be one type of connection between the personal computer and the portable media device and another type connection between the personal computer and the centralized music information server. Thus various types of combinations, components, and configurations for connecting the portable media device, PC, and centralized music information server are contemplated. For example, referring to FIG. 2, the personal computer 210 interfaces with the centralized music information server 215 through the music management software 212 and server interface adapter 213. Further, the personal computer 210 interfaces with the portable music player 205 through the synchronization manager 208 and the portable device manager 204. In one embodiment, the function of the portable device manager 204 is to synchronize all of the user's media library 212 which is located on the personal computer 210 with the media files located on the portable device 205. In one embodiment, synchronization may be accomplished by transferring some or all of the media files located on the personal computer to the portable device.

Turning back to FIG. 1, after the connection is established 100, the playlist data is synchronized 105 between the portable media device and the personal computer. In one embodiment, as depicted in FIG. 2, the synchronization manager 208 manages the transfer of media files from the personal computer 210 to the portable device 205. Furthermore, the synchronization manager 208 stores the transferred media files. Thus, together, the synchronization manager 208 and the portable device manager 204 work together to transfer and list all the media files on the portable device 205.

A list of files to be transferred to the portable device is built 110. In other words, a "target list" is built 110. Referring to FIG. 2, the portable device manager 204 and the synchronization manager 208 work together to create a list of associated artists (can be album, genre, or any other type of category) with the media files that will be stored on the portable device 205 at the completion of the synchronization process.

Turning back to FIG. 1, once the list of complete artists or media files (target list) is built 110, the list may be transferred 115 from the PC to a centralized music information server. In one embodiment, the centralized music information server may be located on the internet, or a network. In one embodiment, the server interface adapter processes a request containing the target list. For example, artists' names are identified, as necessary, using an identification database. In one embodiment, each artist name is assigned a unique identifier corresponding to the particular artist. It is noted that the reference to relationships based on artists is exemplary and that many other types of relationships may be used. It is contemplated in further embodiments that each media file is associated not only, or in addition to, the artist's name, but with respect to the album name, and/or genre name, or any other type of category. For example, in other embodiments, the relationships between one or more media files may be based on an album, track, ratings, user Id, genre and/or era. Of course, other metadata related to a media file may also be utilized to form relationships, depending on the file type and associated metadata. For example, if the media file is a text article, metadata may include author, title, subject or abstract.

Next, as depicted in FIG. 1, the centralized music information server constructs 120 a relationship data between media files in the target list. In one embodiment, the relationships data is a graph constructed and based on a master relationship database. In one embodiment, the graph contains a vertex for each unique artist ID (or any other type of ID) and an edge between artists that are related. The edge contains a value called a "weight" which encodes the strength of the relationship between the two artists. The relationship data set can be constructed in other ways as well, provided the information concerning interrelationships may be stored, interpreted, and accessed in accordance with the teachings set forth herein.

In the embodiment of using artist based relationships, the graph and the mapping of artists' names to IDs are encoded in such a way (for example, serialized) that it may be transferred over the network and sent to the music management software as the reply to the original request.

In an another embodiment, the relationship data between one or more media files may established at the portable device itself, without the use of a remote network server, or other connected comprising devices. In one embodiment, this may be accomplished by forming a relationship data based on analysis of the media files on the portable device and, then by digital signal processing of the device itself. In a further embodiment, the portable device could host the master database of keep or media files relationships and host a method and way for mapping the recordings or media files loaded on the portable device against this database. It should be clear that there are many possible ways to distribute the processing described in the methods of the present disclosure.

Turning back to FIG. 1, the relationship set is constructed 120 (whether via graphs and maps or some other type) 120, the relationship data is sent 125 to the personal computer. For example, referring to FIG. 2, the relationship data is sent from the centralized music server 215 to the personal computer 210 by interfacing the server interface adapter 213 and the music management software 212.

Next, turning back to FIG. 1, the server sends the relationship data to the personal computer and the personal computer sends 130 the relationship data to the portable device. For example, referring to FIG. 2, the personal computer 210 sends the relationship data set to the portable device 205 by interfacing the portable device manager 204 and the synchronization manager 204. At this time 135, the portable device or portable media player contains the relationship data set and is capable of selecting a media file based on a desired relationship measure, a user input, relationship data, and the identity of a media file. In one embodiment, the user can select the media file not only based on based on a desired relationship measure, a user input, relationship data, but also the identity of a media file. In one embodiment, this media file is the currently playing media file. In another embodiment, this media file is the currently paused media file. In one embodiment, the user can initiate the selection and/or playback of these media files on the portable device using the existing user interface buttons or other type of media device input element or icon. These playback functions are described in greater detail further below.

It will be understood throughout the disclosure herein that the specific functions and methods may be carried out in hardware, software, firmware, or combinations thereof, and the variously described features and functions can be distributed across multiple processors, or aggregated into single devices, as a matter of choice. Thus, features or functions described as operable on the device may be carried out on the personal computer, or the personal computer can be eliminated and the portable device may communicate directly with the server, or the server functions can be carried out by the personal computer without the need for the server, etc.

Also, as further described below, a stand alone device capable of autonomously creating and relationship data may carry out the features or functions described as operable on any device. In one aspect, this device has the appropriate processing power and the capability to receive and/or derive the relationship data, invoke a playback function, and to select a media file based on a desired relationship measure, a user input, the relationship data, and the identity of a media file.

Personal Computer Based Media Device Exemplary Embodiment

Figure 4:
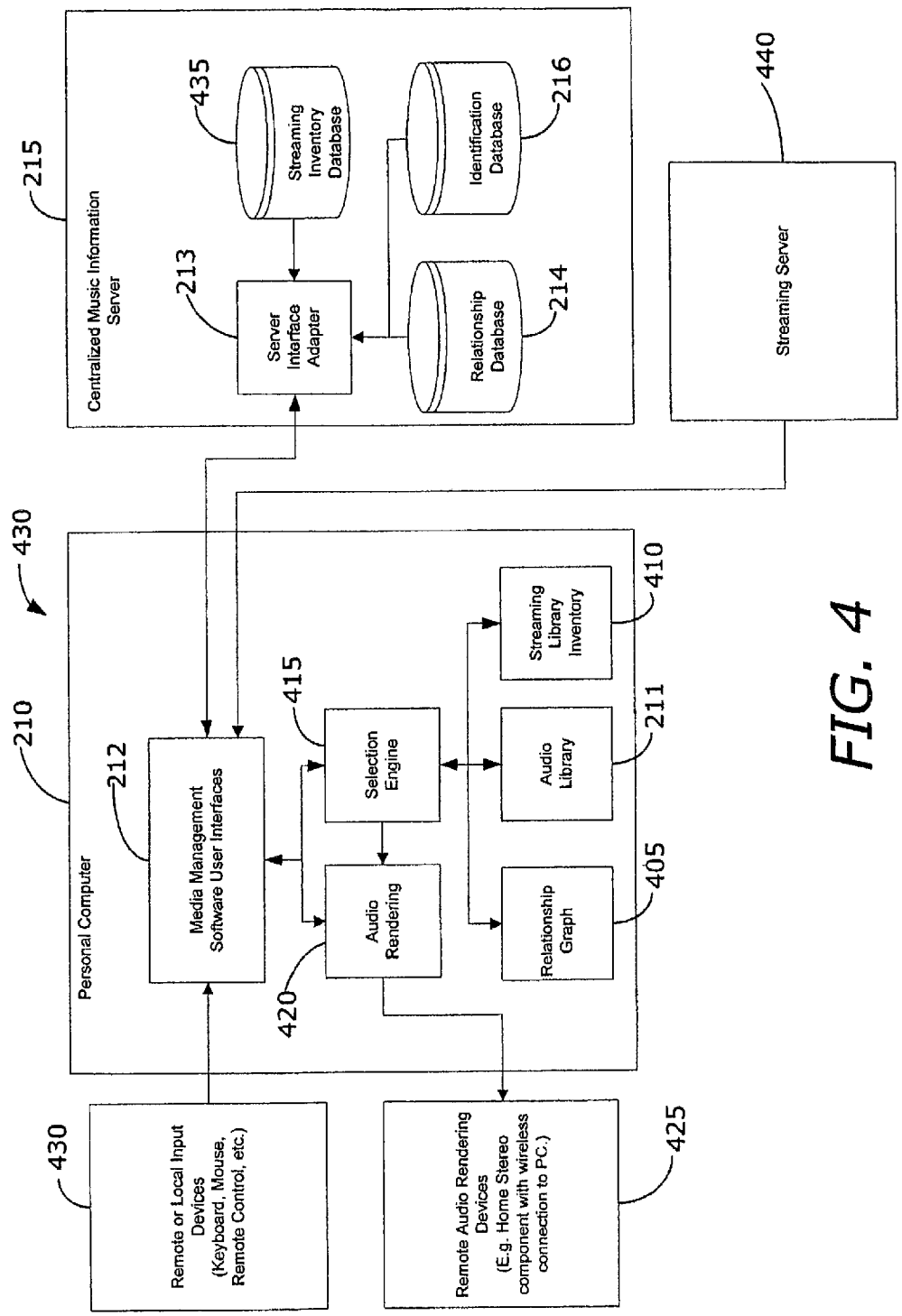
FIG. 4 illustrates an exemplary system configuration or architecture for creating and/or loading relationship data onto a personal computer based media appliance.
Figure 5:
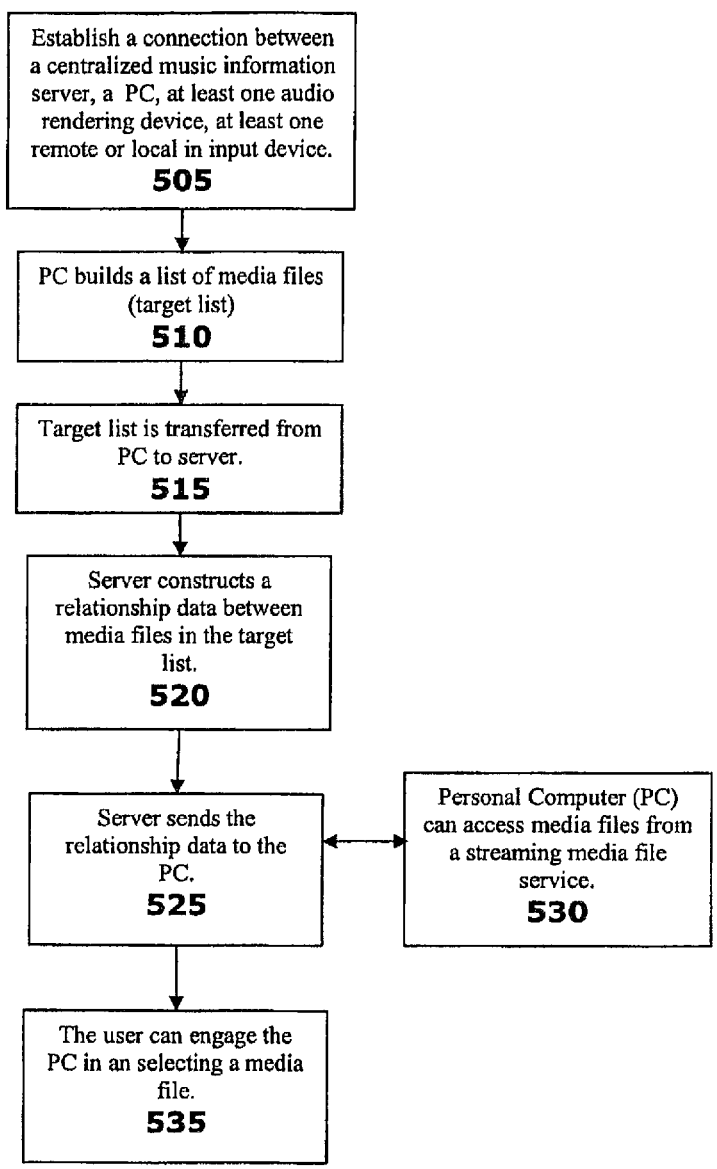
FIG. 5 is a flowchart illustrating an exemplary method of creating and/or loading relationship data onto a personal computer based media appliance.

Another exemplary embodiment of a method, device, and system configuration for selecting a media file based on a desired relationship measure, a user input, relationship data, and the identity of a media file on a personal computer-based music management system is depicted in FIGS. 4 and 5. Examples of personal computer based music management systems include but are not limited to, systems marketed under the trade names YAHOO! MUSIC ENGINE, MUSICMATCH JUKEBOX, WINDOWS MEDIA PLAYER, APPLE ITUNES, AND REAL JUKEBOX. FIG. 5 depicts an exemplary method of creating relationship data and loading the relationship data onto the personal computer. In addition, FIG. 4 depicts an exemplary system architecture or configuration for creating and loading the relationship data onto the personal computer. As depicted in FIG. 5, a connection is established between the centralized music information server, the personal computer, at least one audio rendering device, and at least one remote or local input device 505. Furthermore, in other embodiments, a streaming server can be connected within the system. Referring to FIG. 4, the system configuration includes a personal computer 210, a centralized music information server 215, a streaming server 440, at least one remote or local input device 430, and at least one or more remote or local audio rendering device 425. In particular, the personal computer 210 includes a media management software user interface 212, audio rendering capabilities 420, a selection engine 415, and an artist relationship graph 405 (based on any type of category), an audio library 211, and a streaming library inventory 410. The centralized music information server 215 further includes a server interface adapter 213, a streaming inventory database 435, a relationship database 214, and an identification database 216. Note that it is customary in server environments to distribute load and functionality over multiple servers, thus the functionality represented by the centralized music information server may be implemented by one or more servers. For example, in FIG. 4, the personal computer 210 may be connected to the centralized music information server 215 by interfacing the media management software 212 of a personal computer based music management system 212 and the server interface adapter 213. The personal computer 210 is also connected to the streaming server 440 via the media management software 212. Additionally, the personal computer 210 is connected to at least one remote or local input device 430 via the media management software 212. The personal computer 210 is connected to at least one local or remote input device 430 that provides input events to the media management software 212. The media management software 212 renders audio using the device. Thus, the media management software 212 which may be located on the personal computer 210 acts to integrate the components used to play back the digital audio or media files.

Next, turning back to FIG. 5, after the appropriate connections are made 505, the personal computer builds 510 a list of media files, otherwise referred as a target list. For example, as referring to FIG. 4, the personal computer 210 can build the list of media files via the media management software 212. Then, the media management software 212 transmits a list of artists (or any other type of media file association) to the centralized music information server 215 through the server's interface adapter 213. In one embodiment, the list is comprised of artists associated with locally stored media files from the user's library.

Referring to FIG. 5, then the centralized music information server constructs 520 a relationship data set between the media files and the target list.

After the relationship data is constructed 520, the relationship data is sent 525 to the personal computer. For example, referring to FIG. 4, the centralized music information server 215 sends the relationship data set to the personal computer 210 through the server interface adapter 213 and the media management software 212. Thus, in one embodiment, the centralized music server can construct a relationship data set between the media files and the target list and send the relationship data to the personal computer 210 by assigning each media file an identifier, constructing a graph based on the relationship, and sending back the graph and the map of the artists' or media files' names and IDs back to the media management software located on the personal computer.

In a further embodiment, if the media management software supports streaming media files and the user has access to streaming content, either through subscription or other access modes, the server can supplement the relationships with artists or media files, not stored in the user's local library, but available through the streaming service. This optional step 530 is also depicted in FIG. 5. In one embodiment, based on the settings managed by the user, the selection engine may elect to select a track or media file from the local library or a track or media file from the available streaming library. Portions or the entirety of the streaming library inventory are transferred from the music information server database to the personal computer for use by the selection engine. In one embodiment, the software located on the PC integrates the selection engine to interactively select tracks or media files for playback based on data stored on the relationship graph. In one embodiment, the selection engine may be located on the user's personal computer. In alternate embodiments, the selection engine may be located on a remote server.

Turning back to the method depicted in FIG. 5, next, after the server sends 525 the relationship data to the personal computer, regardless of whether the personal computer accesses media files from the streaming service or personal media library, a user can now engage 535 the personal computer in selecting a media file based on a desired relationship measure, a user input, relationship data, and the identity of a media file. For example, the user can apply a playback function based on the currently playing or paused artist and/or media file. These playback functions are described in greater detail further below.

Media Appliance Exemplary Embodiment

Figure 6:
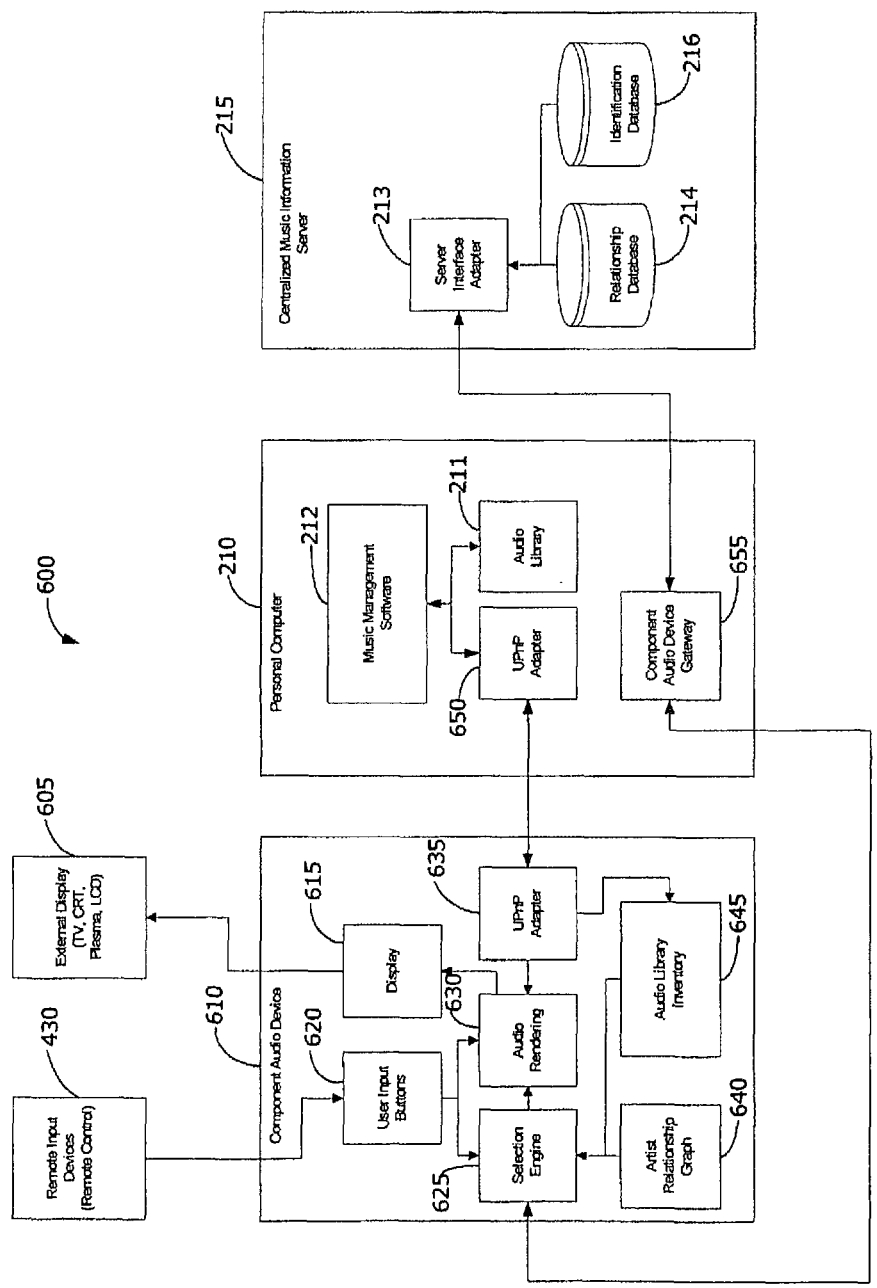
FIG. 6 illustrates an exemplary system configuration or architecture for creating and/or loading relationship data onto a media appliance.
Figure 7:
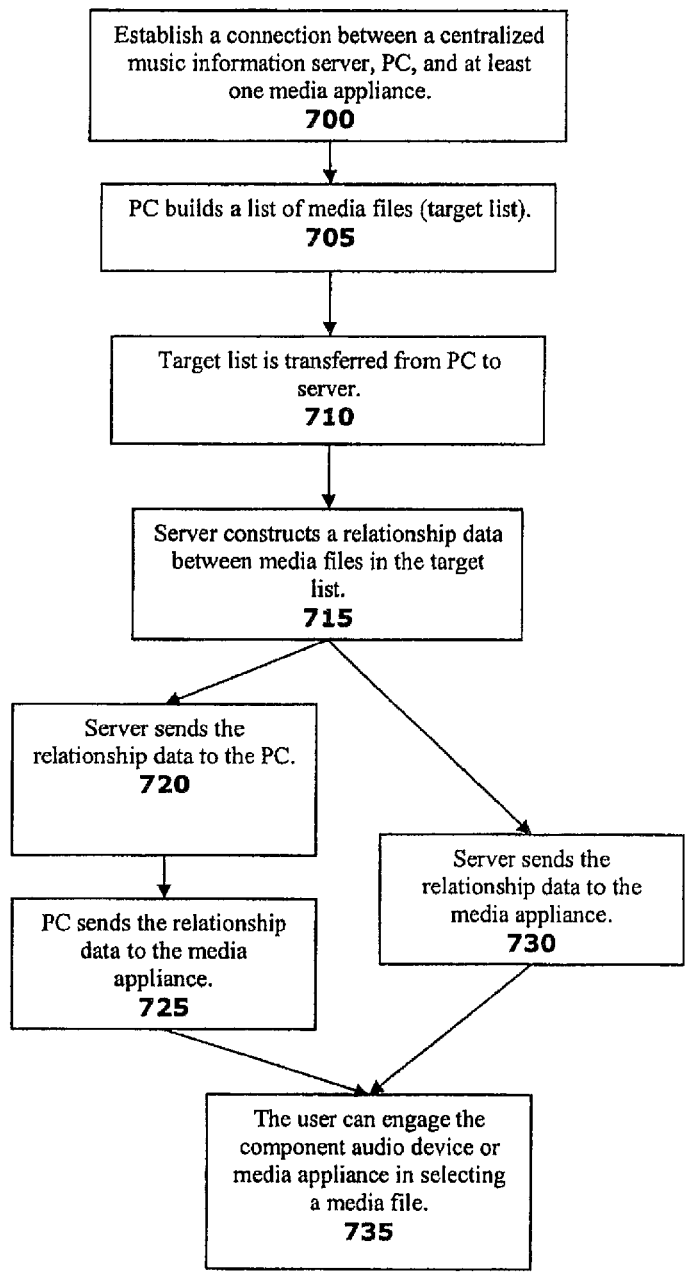
FIG. 7 is a flowchart illustrating an exemplary method of creating and/or loading relationship data onto a media appliance.

Another exemplary embodiment of a system configuration and method for loading and/or creating relationship data onto a media appliance and/or component audio device is depicted in FIGS. 6 and 7. FIG. 6 depicts the exemplary method of creating and then loading relationship data onto a media appliance. FIG. 6 illustrates the system architecture or configuration 600 of a system for loading and/or creating a relationship data using a media appliance and/or a component audio device 610. Such media appliances or component audio devices include, but are not limited to networked component audio devices (digital multimedia receivers) marketed under trade names such as NETGEAR MP101 and LINKSYS WMSL11.

FIG. 7 depicts a connection that is established 700 between a centralized music information server, a personal computer and at least one media appliance and/or component audio device 700. In further embodiments, the component audio device or media appliance is connected to at least one remote input device or local input device and at least one external display. As depicted in FIG. 6, the system configuration 600 of the exemplary embodiment comprises a personal computer 210, a centralized music information server 215, a component audio device or a media appliance 610, at least one remote or local input device 430, and at least one external display 605. As can be seen in FIG. 6, the personal computer 210 further comprises a music management software 212, a UPNP adapter 650, an audio library 211, and a component audio device gateway 655. The centralized music information server 215 comprises a server interface adapter 213, a relationship database 214, and an identification database 216. Further, the component audio device 610 comprises a user input element, or icon such as an input button 620, a display 615, a selection engine 625, audio rendering 630, a Universal Plug & Play (UPNP) adapter 635, an artist relationship graph 640, and an audio library inventory 645. In one embodiment, the external display 605, which is connected to the component audio device 610 or media appliance, includes, but is not limited to, a TV, CRT, plasma screen, LCD or any other contemplated appliances or methods for displaying. In one embodiment, the remote input device 430 or local input device can include a remote control. For example, as depicted in FIG. 6, the component audio device or media appliance 610 is connected to the personal computer 210 via the Universal Plug & Play adaptor (UPNP) 650. In this embodiment, the UPNP adaptor 650 obtains the list of media files and transfers the media files to audio rendering 630 as necessary. Furthermore, the component audio device gateway 655 located on the personal computer 210 interfaces the centralized music server 215 with the selection engine 625 located on the component audio device or media appliance 610.

Turning back to FIG. 7, the personal computer builds 705 a list of media files, (target list). As discussed above, in one embodiment, the personal computer may build and synchronizes the target list with the server. Then, the target list is transferred from the personal computer to the centralized music information server. Then, the server constructs 715 a relationship data between the media files and the target list 715. In one embodiment, the relationship data is constructed by first associating each artist's name or media file with a unique identifier corresponding to the artist or media file. In one embodiment, this is accomplished using the identification database. Then, a graph is constructed based on the master relationship database. The graph contains a vertex for each unique artist or media file ID and an edge between the artist or media files that are related. The edge contains a value called a "weight" which encodes the strength of the relationship between the two artists or media files. The graph and the mapping of the artists' names to the IDs is encoded in such a way that it can be transferred over the network (serialized) and is sent to the media management software as the reply to the original request.

After the server constructs 715 the relationship data, the server either sends 720 the relationship data set to the personal computer or the server can send 730 the relationship data directly to the media appliance. In one embodiment, the server can send the relationship data set to the media appliance through a gateway program installed on a personal computer. For example, referring to FIG. 6, using the component audio device gateway 655, the server 215 can send the relationship data to the component audio device 610. If the server does not send the relationship data directly to the media appliance or component audio device 730, the server can send 720 the relationship data to the personal computer, and then the personal computer will send 725 the relationship data set to the media appliance.

Once the relationship data set is created and loaded onto the component audio device or media appliance 725/730, the user can 735 select media files on the component audio device or media appliance based upon a desired relationship measure, a user input, relationship data, and the identity of a media file. In one embodiment, referring to FIG. 6, the media appliance 610 typically interfaces with at least one remote or local input device 430 and an external display 605 so that the user can view the selection of a media file.

Streaming Media Appliance Embodiment

Figure 8:
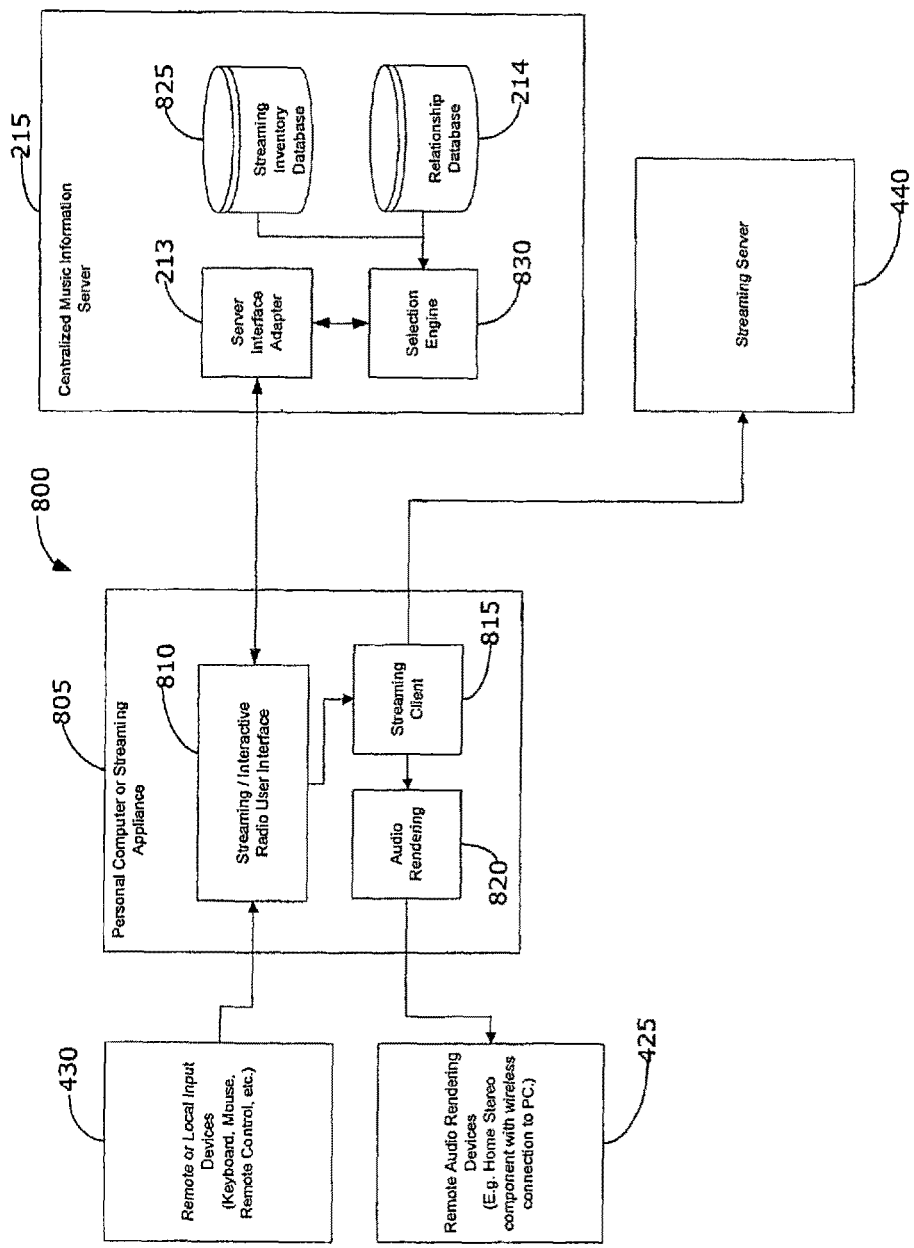
FIG. 8 illustrates an exemplary system configuration or architecture for creating and/or loading relationship data onto a streaming media appliance.
Figure 9:
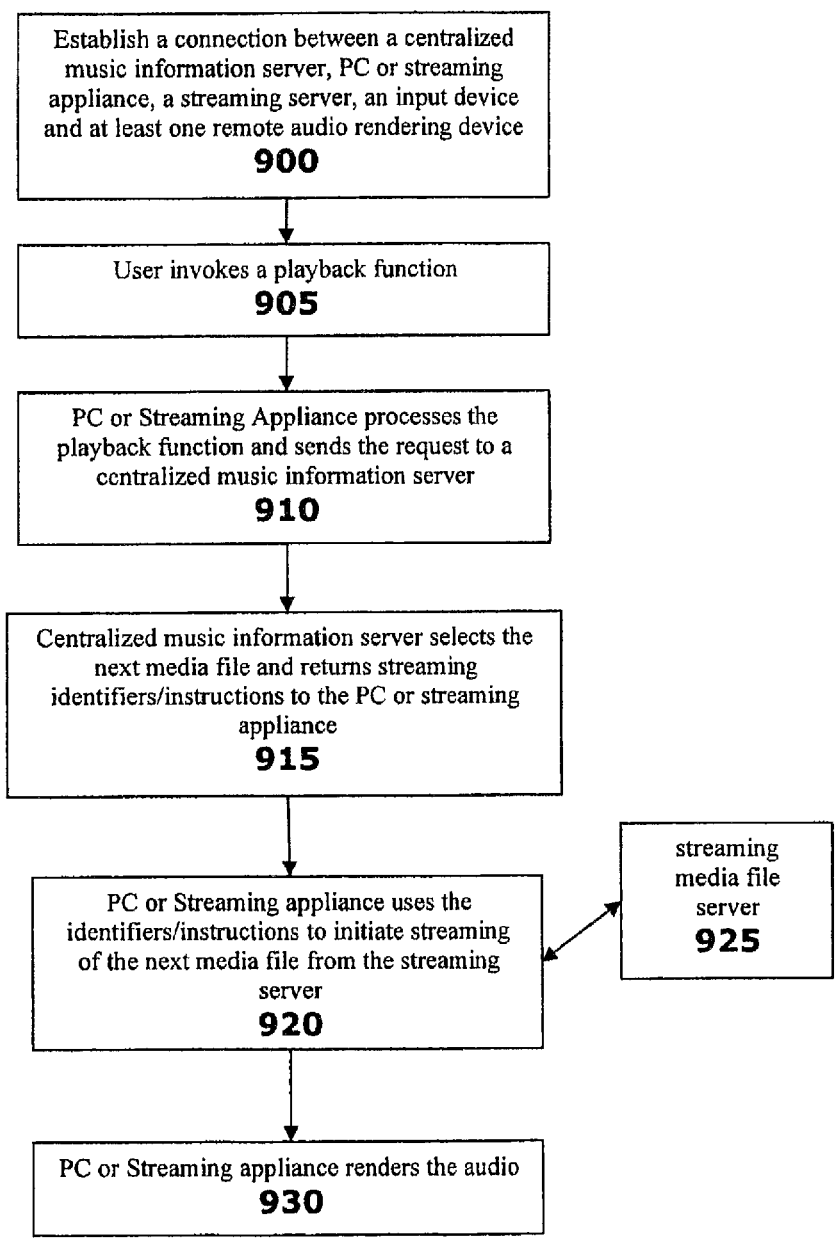
FIG. 9 is a flowchart illustrating an exemplary method of creating and/or loading relationship data onto a streaming media appliance.

Another exemplary embodiment of a system and method for selecting a media file using a streaming media appliance is depicted in FIGS. 8 and 9. FIG. 9 depicts an exemplary method of creating relationship data and loading the relationship data onto a personal computer or other type of streaming media appliance. FIG. 8 depicts an architecture or configuration of a system for selecting a media file using a personal computer or other streaming appliance 805. Such streaming appliances include, but are not limited to items marketed under trade names such as the PHILIPS STREAMIUM. PC based streaming applications include services such as those marketed under trade names REAL RHAPSODY, YAHOO! UNLIMITED and MUSICMATCH 'ON DEMAND'.

As depicted in FIG. 9*a*, a connection is established 900 between at least a centralized music information server, a personal computer or streaming appliance, a streaming server, an input device, and/or an audio rendering device.

Next, the user invokes 905 a playback function. Then, the personal computer or streaming appliance process 910 the playback function as a request and sends this request to a centralized music information server. (E) As depicted in FIG. 8, the system configuration of the exemplary embodiment comprises a personal computer or streaming appliance 805, a centralized music information server 215, a remote or local input device 430, and optionally, a remote audio rendering device 425. Such remote or local input devices 430 include, but are not limited to a keyboard, mouse, and/or remote control. Such remote audio rendering devices 425 include, but are not limited to a home stereo component with a wireless connection to the personal computer or streaming appliance 805. Audio rendering may also take place through direct attached amplifiers and speakers. As seen in FIG. 8, the personal computer or streaming appliance 805 comprises a streaming/interactive radio user interface 810, audio rendering capabilities 820, and at least one streaming client 815. In this embodiment, the audio is streamed from a remote server 440. The streaming client component 815 receives the audio stream from the remote server 440 and a rendering component renders the audio 820 to local or remote amplifiers and speakers. The centralized music information server 215 comprises at least a server interface adapter 213, a relationship database 214, a selection engine 830, and a streaming inventory database 825. For example, referring to FIG. 8, the personal computer or streaming appliance 805 facilitates this communication with the centralized music information server 215 through the streaming/interactive radio user interface 810 and the server interface adapter 213.

Next, turning back to FIG. 9, the centralized music information server selects 915 the next media file and returns streaming identifiers/instruction to the personal computer or streaming appliance. Then, the personal computer or streaming appliance uses the identifier/instructions to initiate 920 streaming of the next media file from the streaming server. Thus, the personal computer or streaming appliance communicates 925 with the streaming media file server. In one embodiment, referring to FIG. 8, the streaming is initiated by the streaming client 815 located on the personal computer or streaming appliance 805 and the streaming server 440.

Next, turning back to FIG. 9, the personal computer or streaming appliance renders 930 the audio. In one embodiment, referring to FIG. 8, the personal computer or streaming appliance 850 renders the audio through its audio rendering capabilities 820 which is connected to a remote audio rendering device 425.

In another exemplary embodiment, the relationship data is created autonomously by a stand alone device (not depicted). In one aspect, this device has the appropriate processing power and the capability to receive and/or derive the data used to create and implement the relationship data, and playback functions. In one exemplary embodiment, the stand alone device would have the full capabilities of the embodiments described above, yet may not require being connected to server, and/or connection to a separate audio rendering device, and/or require a separate display device.

Regardless of the particular system architecture or configuration, device, described in the exemplary embodiments above, in some embodiments, the method and system for selecting a media file is based upon relationship data. In other embodiments, the method and system for selecting a media file is based on relationship data and attributes associated with a media file. Furthermore, it is contemplated that given an appropriate set of relationship data one skilled in the art will be able to re-create the invention for a wide variety of media types and system configurations now known or hereafter to become known, whether hardware or software, wired or wireless, terrestrial or satellite-based.

One aspect of the relationship data is to denote a relationship measure. For example, the similarity of one media file to another media file. Thus, one relationship can deal with Media File A and Media File B, and the relationship is defined as the probability that Media File B will directly follow Media File A as a selected media file. In one embodiment, the relationship data may be based on these probabilities and other similar statistics that can be established or determined by analyzing explicit and/or implicit user playlist data among a population of users. The population can be large or small, from one user to many, or may in fact encompass an entire user population of a music service provider. For example, the relationship data can be based on recording and analyzing the explicit and/or implicit user behavior on an on-demand streaming media service. A community site that encourages users to publish and share playlists is another source of data that can be used to derive relationship data. Media players that report the sequence of songs played or the playlists created by end users is another source of this data. E-commerce applications that sell media, peer-to-peer applications that observe the files a user requests or downloads, or music recognition services that observe at least some of the contents of a user's media library through recognition requests are other possible sources of data that can be used to form relationship data.

In one embodiment, a relationship measure is based on a particular degree of similarity between one or more media files. In one embodiment, the degree of similarity between at least two media files is based upon whether the two media files are associated with the same or similar genre. In another embodiment, the degree of similarity between at least two media files is based upon whether the two media files are related by a statistical measure of co-occurrences in playlists, documents, purchased behavior, explicit user preferences, and/or observed user interactions with web sites or services. In another embodiment, the degree of similarity between at least two media files is based upon whether they are associated with artists that are related by statistical measure of co-occurrences in playlist, documents, purchase behavior, explicit user preferences, or observed user interactions with web sites or services. In another embodiment, the degree of similarity between at least two media files is based upon whether they are associated with albums that are related by statistical measure of co-occurrences in playlist, documents, purchase behavior, explicit user preferences, or observed user interactions with web sites or services. In another embodiment, the degree of similarity between at least two media files is based upon whether the media files are identified as similar by expert or naïve listeners. In another embodiment, the degree of similarity between at least two media files is based upon whether the media files have similar attributes as perceived by listeners. For example, tempo, mood, and/or rhythmic power or intensity, and/or volume. In further embodiment, the degree of similarity between at least two media files is based upon whether the media files have similar attributes as extracted by algorithms that that analyze the wave forms of the recordings.

Once the relationship data is created and loaded onto the device, the user can engage in playback functions based on the currently playing artist and/or media file. These playback functions enable the user to select media based on a desired relationship measure, a user input, relationship data, and the identity of a media file. Such playback functions include, but are not limited to, a "Next" playback function, a "Small Skip" playback function and a "Big Skip" playback function. Moreover, while reference is made herein to playlists, no particular playlist or subset of media files need to be selected from, but rather the entire universe of available media may be utilized as the playlist, or any portion or subset thereof.

Each one of these playback functions or functionalities is invoked by a user input and represents a particular relationship measure between one or more media files whether based on artist, genre, album, track, ratings, another user, or era relationships. Thus, a playback function which can be invoked by a user input can correlate to a degree of similarity between media files. Invoking a playback function allows the user to select a media file based on a desired relationship measure, a user input, relationship data, and the identity of a media file.

For example, in one embodiment, the "Next" playback function represents a high level of similarity between the currently playing or paused media file and the next media file to be played. Thus, if the user wishes the next media file to be very similar to the currently playing or paused media file, the user can invoke the "Next" playback function. The methods for invoking the playback functions are described in further detail below. Further, the "Small Skip" playback function represents a mid level of similarity between the currently playing or paused media file and the next media file to be played. Thus, if the user wishes the next media file to be somewhat similar to the currently playing or paused media file, the user can invoke the small skip playback function. Again, the methods for invoking the playback functions are described in further detail below. Accordingly, the "Big Skip" playback function represents a low level of similarity, i.e. dissimilarity, between the currently playing or paused media file and the next media file to be played. Thus, if the user wishes the next media file to be dissimilar to the currently playing media file, the user can invoke the big skip playback function. Again, the methods for invoking the playback functions are described in further detail below. Of course, it is contemplated that there can be numerous types of playback functions each associated with a particular degree of similarity or based on any type of relationship that can be constructed between one or more media files. For example, the device could present an array of knobs or input elements to the user representing genre, era, tempo, and artist-similarity. Thus for example, a small turn of the knob would select a next track that is similar to the previous track on that dimension. A large turn of the knob would select a track that is dissimilar to the previous track along that dimension. In another embodiment, there could be multiple skip controls for genre, artist, tempo, etc., that facilitate making a small skip in genre but a big skip in artist. Other control linkages and combinations can be carried out in accordance with the teachings herein.

In one exemplary embodiment, the relationship data is created using artist relationships and is loaded onto a media or device. Of course any type of relationship may be used such as genre, album, track, or any other type of category.

Figure 14:
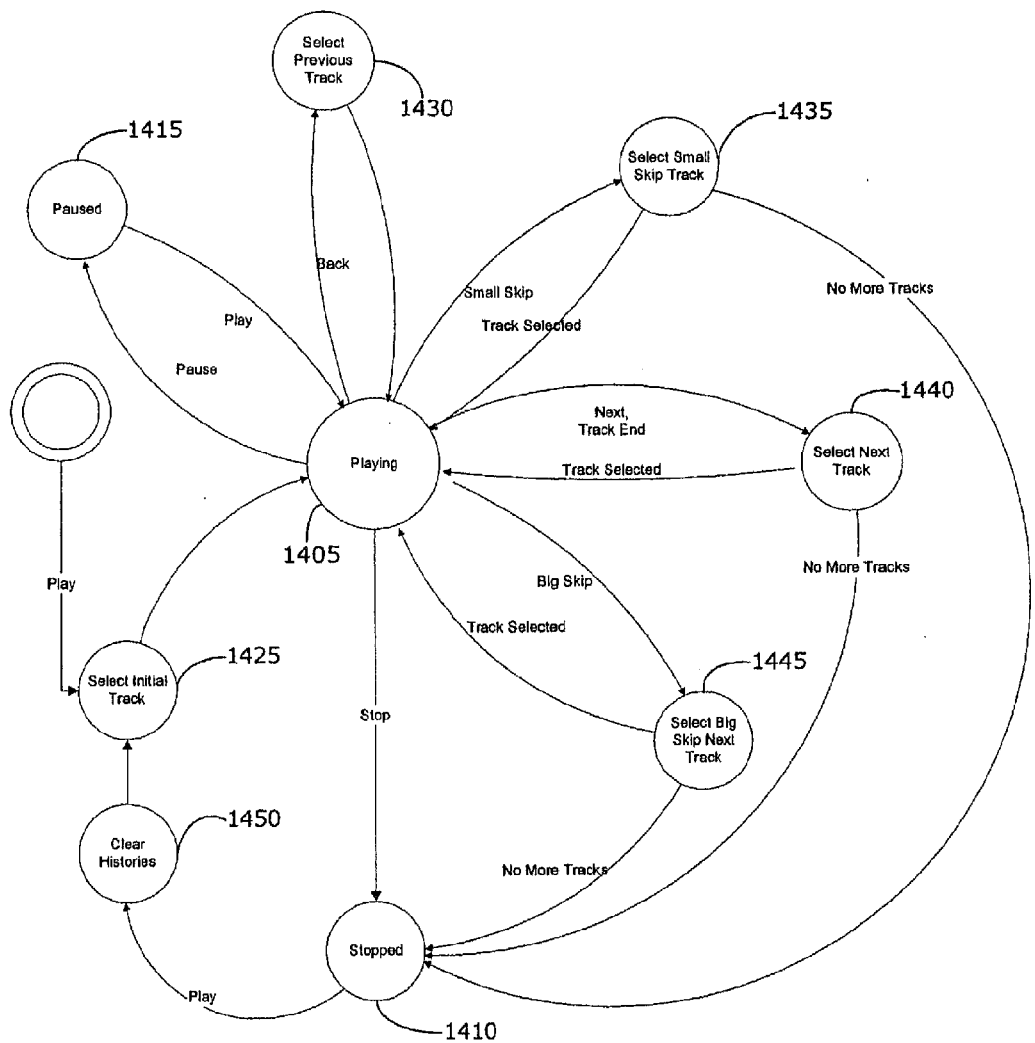
FIG. 14 illustrates a state machine of one exemplary embodiment.

An exemplary state machine for this embodiment is depicted in FIG. 14. As can be seen in FIG. 14, the portable media player can be in a playing 1405, paused 1415, or stopped 1410 state. The user can select media files by playing, stopping, pausing within the playlist and engage in playback functions such as "Back" 1430, "Next" 1440, "Small Skip" 1435, or "Big Skip" 1445.

In one embodiment, the user can select the initial media file or track 1425 manually. In an alternative embodiment, the initial media file or track can be selected 1425 randomly.

In one embodiment, the playing state 1405 denotes that the system is reproducing a media file. From this playing state 1405, the user can invoke any one of the playback functions to select a media file. If the user selects any one of the playback functions (Back 1430, Next 1440, Small Skip 1435, or Big Skip 1445), a new media file is selected and the media device begins playing that new media file. In one embodiment, the audio rendering engine starts playback of the media file. In a further embodiment, if the user selects play during the playing state 1405, the system "re-centers" on the current track and the current track becomes the 'Playlist Center'. For example, in an embodiment based on artist relationships, if the system is centered on artist A and the system plays related artist B, then the system can re-center on artist B if the user presses the play button while artist B is playing, meaning, artist B becomes the current or "center" (Playlist Center). In one embodiment, this means that if the user does not execute a playback function, some fixed percentage of tracks will be chosen from the artist at the "center" of the playlist and the remaining percentage will be chosen from artists that are similar to the artist at the "center".

In one embodiment, the stopped state 1410 is similar to a start state, meaning, no media files are being played. Thus, a play event may be required to initiate playing of the media files.

In one embodiment, the "Back" playback function 1430 selects and replays the current track from the start, or plays the previous track if the current track has not yet started (or is already very near the beginning.) Furthermore, the "Back" playback function 1430 resets the Playlist Center to the artist associated with the selected track.

As can be seen in FIG. 14, when a media file is playing 1405, and the current track ends or the user invokes the "Next" playback function 1440, the next playback function logic (FIGS. 16 and 17) is executed, and the next track is selected and is played 1405.

Furthermore, when the media file is playing 1405 and the user invokes the "Small skip" playback function 1435, the small skip playback function logic (FIGS. 16 and 17) is executed and the next track is selected and is played 1405.

Accordingly, as depicted in FIG. 14, when the media file is playing 1405 and the user invokes the "Big Skip" playback function 1445, the big skip playback function logic (FIGS. 12 and 13) is executed and the next track is selected and played 1405. Also, in one embodiment, when the media player transitions from a stopped state 1410 to a playing state 1405, the media file histories are cleared 1450, that is the histories the algorithms prevent repeated media files.

In one embodiment, the system chooses the next media file based upon the artist that is the playlist center. In further embodiments, the Playlist Center can be an album, genre, track, and or era.

Figure 16:
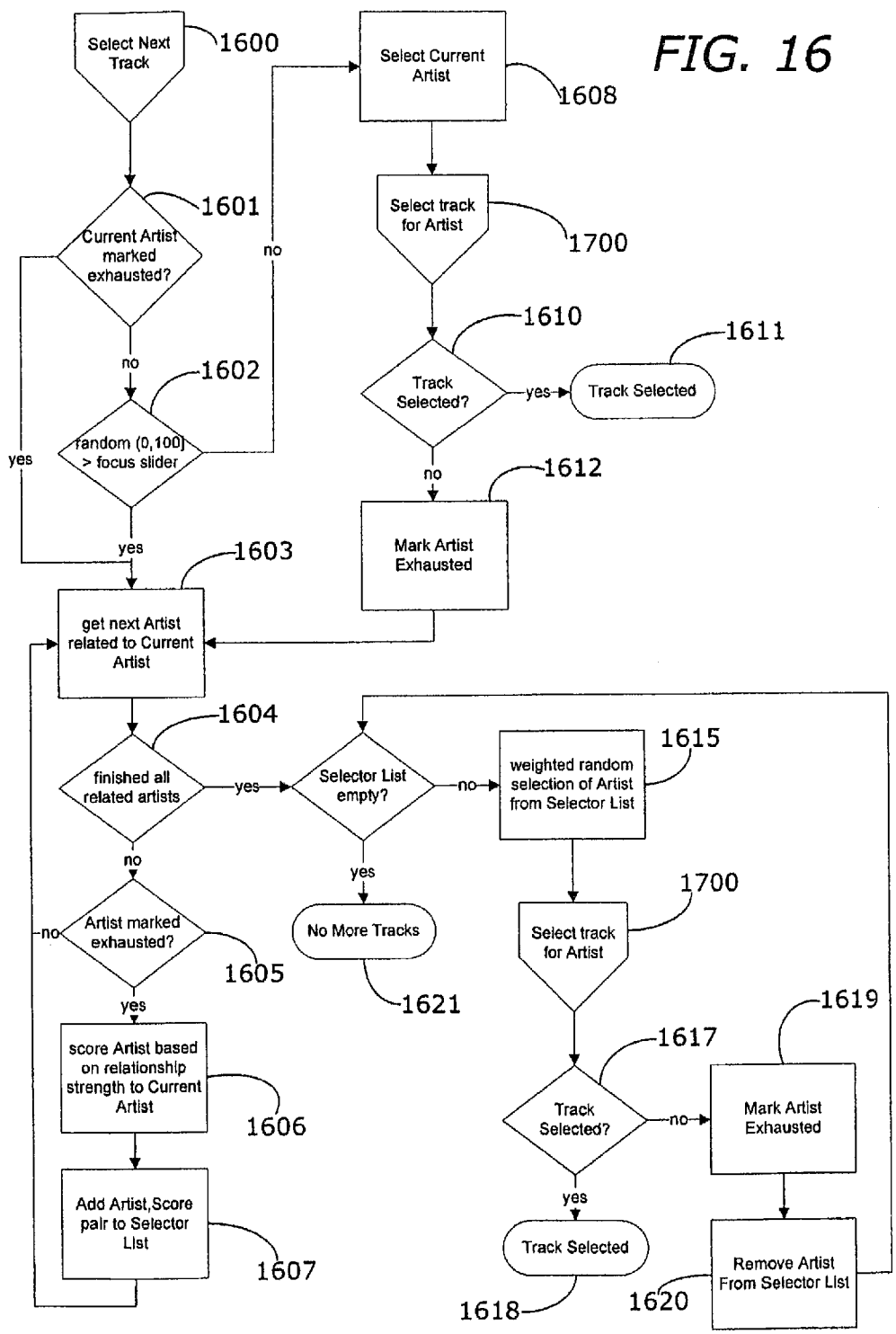
FIG. 16 illustrates an exemplary embodiment of the artist selection logic supporting a playback functions using artist-based relationships.
Figure 17:
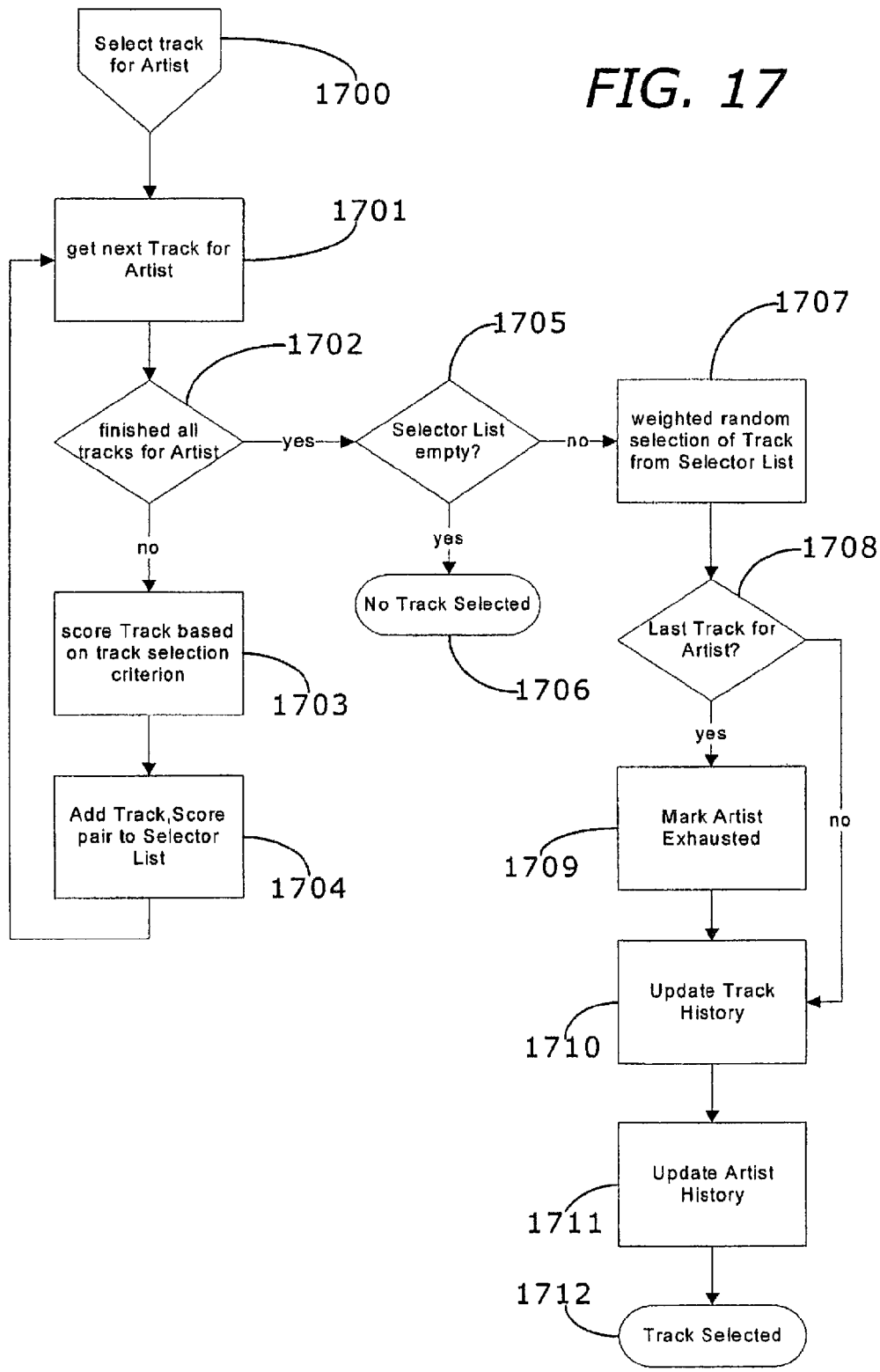
FIG. 17 is a flowchart illustrating an exemplary embodiment of the track selection logic supporting playback functions using artist-based relationships.

FIGS. 16 and 17 depict an exemplary embodiment of the logic supporting the next playback function when the relationship data is based on artist relationships. Specifically, in an embodiment where the relationship data is created from artist relationships when the next playback function is selected, the system selects the next artist based on the artist playlist center (denoted current artist in FIG. 16) as depicted in FIG. 16. Then, as depicted in FIG. 17, once the next artist is determined, the system determines which track or media file from that artist will be selected and played.

As depicted in FIG. 16, the next playback function logic is triggered when the user selects the "Next" playback function. As stated earlier, the next playback function is correlated to a particular user interface button. Alternatively, the "Next" playback function is correlated and invoked by a specific pattern of pressing a user interface button. For example, the "Next" playback function could be correlated to the fast forward button of the device's user interface or to pressing the fast forward button twice rapidly or in any other pattern. Furthermore, the "Next" playback function is preferably associated with a highly similar media file with respect to the current Playlist Center media file. In FIG. 16, the relationship and similarities are based upon how artists are related to one another and how similar one artist is to another.

First, the user invokes the "Next" playback function, 1600 by pressing the designated button or dial, key pattern, or associated key on the device's user interface or any other type of input element. In another embodiment, the "Next" playback function is invoked by a user input which can further include a voice activated command. In one embodiment, the "Next" playback function is also invoked automatically on the user's behalf when the currently playing track ends.

Next, the system determines whether the current artist is marked as exhausted or not 1601, meaning, whether the current artist has no more un-played tracks. If the current artist is not marked as exhausted, the system generates a random number between 0 and 100 and then compares 1602 this number to the focus setting position. This comparison 1602 determines whether the media file should be selected from the current artist or a related artist.

If the current artist is selected 1608, then the system attempts to select a track 1700 for the artist and determines if a track 1610 can be selected. If no track can be selected, the artist is marked 1612 as exhausted, meaning the artist has no more un-played tracks. Otherwise, a track from that artist is selected 1611 for playback.

If the artist is exhausted 1612, then the system selects 1603 a next related artist relative to the current artist. Furthermore, the system will reach this step 1603 if the system determined that the next artist to be selected should be a related artist and not the current artist.

If a track from a related artist will be chosen, all artists related to the current artist are scored 1606. In one embodiment, scores are generated based on the strength of the relationship to the current artist (stronger relationships score higher) 1606 and are biased by the history of which has been recently played. For example, related artists that have been played in the last 5 (or any other number) tracks get a score of 0.0. In one aspect, this biasing ensures that a high scoring artist who has been played in the last 5 times is not selected again.

In one embodiment, the weights in the artist relationship graphs represent the rank of the related artists. For example, the most similar artist receives rank of 1.0, the next most related artist gets a rank of 2.0, the next most related artist gets a rank of 3.0 and so on. In the present embodiment, the inverse (1.0/rank) is used as the base score for selection of related artists. Of course, many alternate formulations are possible and should be considered as configuration or tuning parameters.

After the related artists are scored 1606, related artists and their associated scores are added 1607 into a list for selection. The process of scoring 1607 artists and adding 1607 each score to the selector list is repeated until all the related artists have been scored. If the selection list is empty 1612, the system will return 1621 a response indicating that there are no more tracks.

Once all the related artists are scored, a random number is generated and applied 1615 to the list such that the probability of selection of an element is proportional to its score relative the other elements in the list. One such technique is to ensure that all scores in the list are non-negative. A random number is generated between 0.0 and the sum of all scores in the list. The list is iterated until the sum of scores of iterated elements would equal or exceed the random number. The last element in the iteration is selected. One skilled in the art can easily implement this technique or similar ones yielding the same results.

Once the artist is determined, a track for the artist is selected 1700. If there are no more tracks to be selected from the artist, the artist is marked 1619 as exhausted and the artist is removed 1620 from the selection (selector) list. FIG. 17 depicts one exemplary embodiment of the track selection logic for an artist-based relationship embodiment.

As can be seen in FIG. 17, each track or media file associated with the selected artist is scored 1703. In one embodiment, the tracks or media files are scored relative to their popularity attribute. Thus, the position of the popularity setting determines how the popularity attribute will affect the probability of track or media file selection. The popularity position is discussed in further detail below.

Using logic similar to that described for selecting relating artists, each track or media file is scored 1703 based on track selection criteria and then added 1704 into a selection or selector list. This process (1701-1704) is repeated until all the media files or tracks for that particular artist have been scored 1703 and added 1704 to the selection list. Then a weighted random selector chooses 1707 the appropriate track. When the last track for the artist has been selected 1708 the artist is marked as exhausted 1709 and the track history is updated.

The chosen track or media file and its associated artist are added to history tables 1710, 1711. In one embodiment, the media file or track history tables prevent the same media file or track from being repeated in a single session. In a further embodiment, the artist history table ensures a variety of related artists are played. Thus, history tables are used to prevent repetition in the media files being selected. In one embodiment, the history tables are used when scoring tracks 1703 or artists 1606 for selection. In a further embodiment, the song or other attribute of the media file is added to a table to prevent alternate renditions of the same media file from appearing.

In another embodiment, a list of the last 5 (or other number) artists played is also maintained. When choosing a related artist, an artist's score is penalized to 0.0 when that artist is associated with one of the last five tracks played.

Furthermore, in one embodiment, a set of all artists played in the session is kept. In particular, a set of all artist edges that have been used is kept. When selecting the next artist, if the candidate relationship already has been used, a penalty is applied to reduce the probability of selection of the repeat edge. The penalty factor for repeat edges is a parameter to the system and is applied as a multiplicative factor to the relationship score. The repeat edge penalty factor ranges from 0.0 (maximum penalty) to 1.0 (no penalty). Thus, when the user invokes a playback function, artists or media files that have already been played will not be chosen. In one embodiment, the transition from Stopped to Playing state clears the histories and creates a new 'session'.

In another exemplary embodiment, the logic supporting the "Small Skip" playback function is the same as "Next" playback function logic as depicted in FIGS. 16 and 17 with the exception that a new artist is always selected and this new artist becomes the Playlist Center. As described above, in an embodiment where the relationship data is created from artist relationships, when the "Small Skip" playback function is selected, the system selects the next artist based on the Playlist Center/current artist. Then, once the next artist is determined (FIG. 16), the system determines (FIG. 17) which track or media file from that artist will be selected and played and the selected artist becomes the new current artist.

In one embodiment, when the user invokes a number of "Small Skip" playback functions, the user can move through a plurality of media files in small increments with each step related to the previous step. Accordingly, the history mechanism generally prevents repeat artists, so the system will tour through the user's media library or set of media files. While each track is related to the previous track, the current track, after a number of skips, may be far removed from the starting track.

In one embodiment, in contrast to the "Small Skip" playback function, the object of the "Big Skip" playback function is to choose a track or media file that is unrelated or dissimilar to the currently playing track. In one embodiment, the relationship data score which relates every item to every other item, as used to determine the "Next" playback function logic is inverted. Thus, the Big Skip log is the same as depicted in FIGS. 16 and 17, except that the relationship score (1606 in FIG. 16) is inverted. Thus, resulting in selecting a dissimilar artist and then track.

In one embodiment, if relationship data is incomplete, that is, each artist in a graph of the relationships is only directly connected to a subset of all the artists in the graph; a 'shortest path' graph traversal algorithm can be used to compute the distance between any two artists. For example, the Dijkstra Shortest Path algorithm is well known to those skilled in the art and can be used for this purpose. However, often, the Dijkstra algorithm results in the second and third order relations being extremely weak compared to first order relationships. In one embodiment, a solution is to create a relationship graph that stores only the top N relations for each artist and contains homogenous weights (for example, 1.0). In this embodiment, the Shortest Path algorithm calculates the number of invoked playback functions required to get from artist A to artist B. This forms the basis of the score used to select an appropriate artist for the "Big Skip" playback function.

In a another embodiment, an alternative formulation for the "Big Skip" playback function is to use "Genre based" playback functions. The "Genre Based" playback function uses the same relationship/graph based algorithms as discussed in the embodiments above. In one aspect, a genre is a label placed on a set of artists, albums, or tracks that are thematically related. Genres can be determined by clustering the elements comprising them. Usually, however, human experts create genres by categorizing based on styles, roots, peers, and influences.

In one exemplary embodiment, a genre is comprised of a label and a ranked set of artists. The rank of an artist within the genre is determined by the 'fit' of the artist to the genre. Furthermore, an artist within a genre can be ranked by looking at the artist relationships and scoring based on how many of the related artists are also in the set defined by the genre.

Alternate embodiments of the present disclosure could define genres in terms of sets of albums, tracks, or other recordings. For example, other types of media such as in the television domain, one might use a channel as the genre for the programs that appear on that channel.

In one embodiment, a relationship graph is constructed for the set of genres. In the case of music and artist-based genres, the relationship strengths are defined in terms of the number of artists in common. In another embodiment, genres are ranked by number of artists in common and the rank becomes the weight in the relationship graph.

Figure 11:
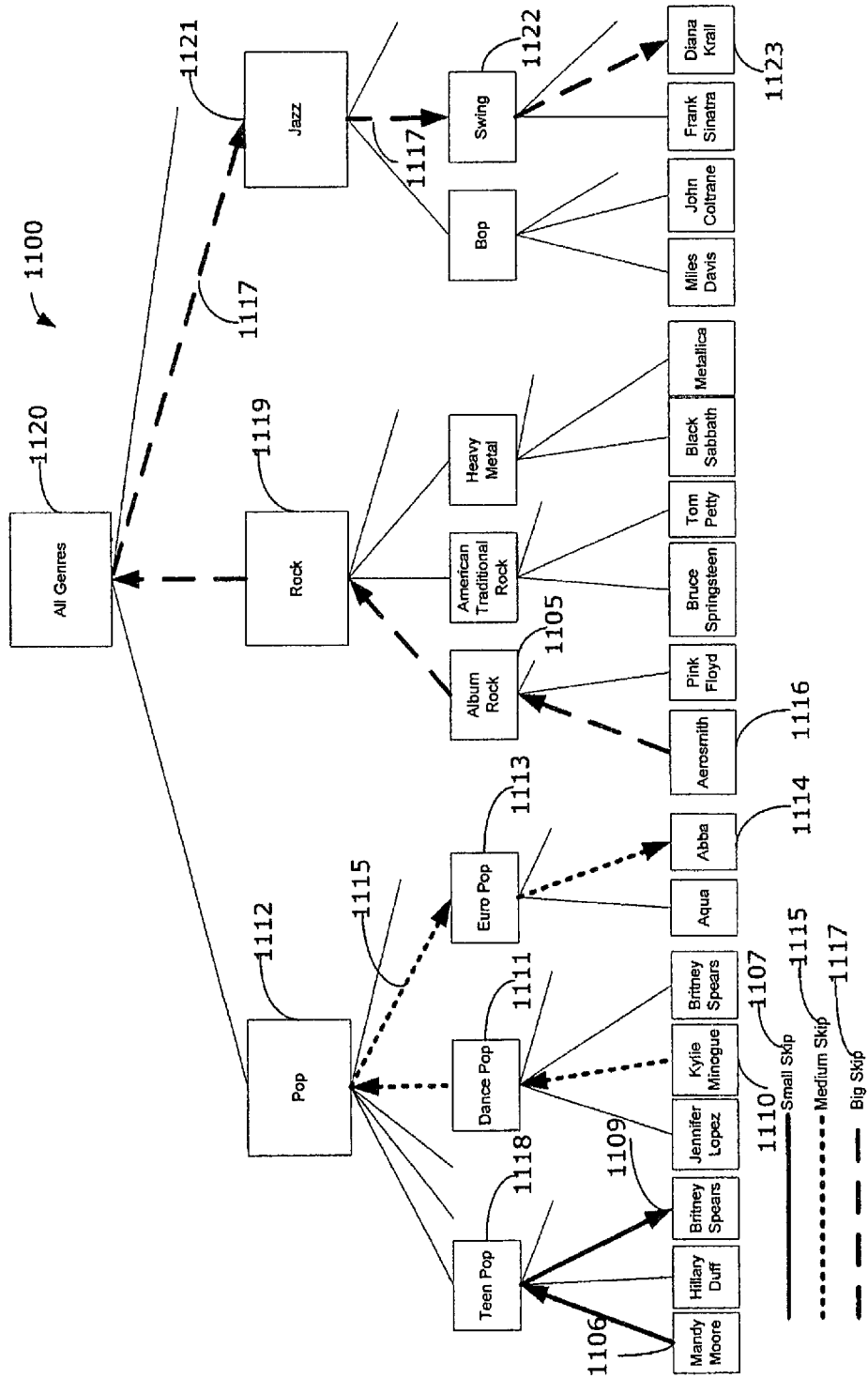
FIG. 11 illustrates a organizational tree built on genre-based relationships.

In yet another alternate embodiment, sub-genres and super-genres can also be used to define relationships and relationship data. In this embodiment, sub-genres are grouped under super-genres. When a hierarchical categorization of content is available, skips or movement from one media file to another, of different magnitudes can be achieved by going up one or more levels of the tree, making a lateral move, and descending again as illustrated in FIG. 11. As depicted in FIG. 11, a hierarchical (tree) organization of genres 1100 is depicted. Within this tree 1100, numerous playback functions such as a "Small Skip", "Medium Skip", and "Big Skip" can be executed. Furthermore, the sub-genres are represented by items such as 1118, 1111, 1113, 1105 and 1122; the super-genres are represented by items such as 1112, 1119, and 1121; and the root of the genre tree is represented by item 1120. FIG. 11 illustrates an example of how these playback functions allow the user to select a media file based in part upon genre relationships.

In particular, in FIG. 11, a "Small Skip" playback function is illustrated by a solid, bold line 1107. As shown in FIG. 11, when the user invokes the "Small Skip" playback function within a genre based hierarchy, the solid, bold line 1107 ascends to the parent node and descends to a different artist in the same sub-genre. In one embodiment, a "Small Skip" playback function represents a mid level of similarity between the currently playing media file and the media file to be played next. For example, in FIG. 11, considering the currently playing artist, Mandy Moore 1106, invoking the "Small Skip" playback function results in selecting Britney Spears 1109 as the next media file. As can be seen in FIG. 11, the solid, bold line 1107 which represents the "Small Skip" playback function 1107 begins at the artist Mandy Moore 1106, moves to the parent node, Teen Pop 1118, then descends to a different artist, Britney Spears 1109.

Similarly, in FIG. 11, a medium skip playback function is illustrated by a dotted line 1115. As shown in FIG. 11, when the user invokes the "Medium Skip" playback function within a genre-based hierarchy, the dotted line 1115 ascends two levels in the tree (up a sub genre and a genre) and then descends two levels down to another artist. In one embodiment, a "Medium Skip" playback function could represent a mid level of similarity (as compared to the Small Skip and Big Skip as described in the present embodiment) between the currently playing media file and the media file to be played next. For example, in FIG. 11, considering the currently playing artist, Kylie Minogue 1110, invoking the "Medium Skip" playback function results in selecting Abba 1114 as the next artist file. As can be seen in FIG. 11, the dotted line 1115 which represents the "Medium Skip" playback function begins at the artist Kylie Minogue 1110, moves up two parent nodes Dance Pop 1111 and Pop 1112, and then descends down two a different node Euro Pop 1113 and then to a different artist, Abba 1109.

Further, in FIG. 11, a "Big Skip" playback function is illustrated by a dashed line 1117. As shown in FIG. 11, when the user invokes the "Big Skip" playback function within a genre-based hierarchy, the dashed line 1117 ascends three levels in the tree and then descends three levels down to another artist.

In one embodiment, a "Big Skip" playback function could represent a low level of similarity or dissimilarity (as compared to the Small Skip and Medium Skip as described in the present embodiment) between the currently playing or paused media file and the media file to be selected next. For example, in FIG. 11, considering the currently playing artist, Aerosmith 1116, invoking the "Big Skip" playback function results in selecting Diana Krall 1123 as the next media file. As can be seen in FIG. 11, the dashed line 1117 which represents the "Big Skip" playback function 1117 begins at the artist Aerosmith 1116, moves up three parent nodes Album Rock 1105, Rock 1119, and All Genres 1120, and then descends down two different nodes Jazz 1121, Swing 1122 and then to a different artist, Diana Krall 1123.

Figure 12:
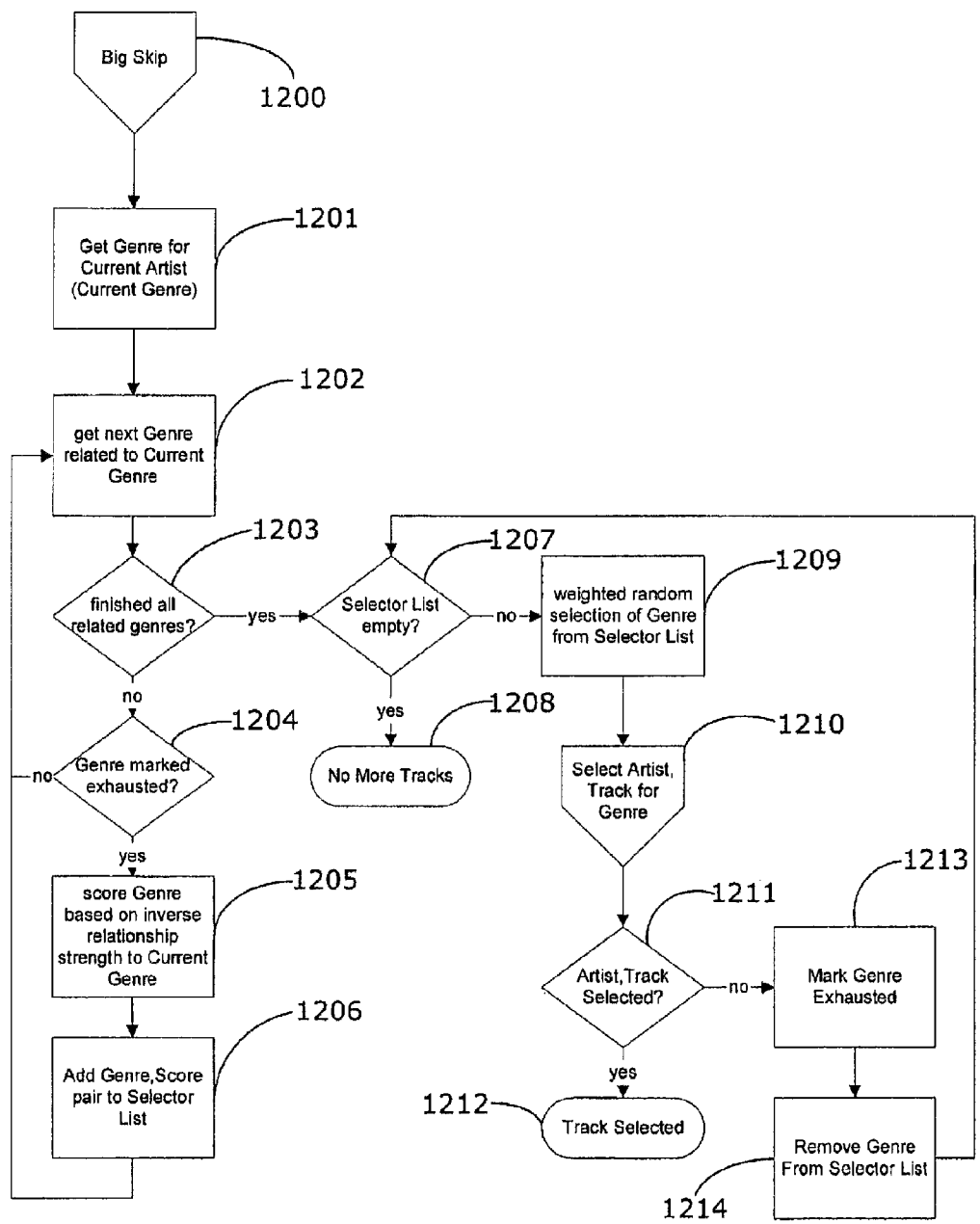
FIG. 12 illustrates an exemplary embodiment of the artist selection logic supporting a big skip playback function using genre-based relationships.

An exemplary embodiment of the logic supporting a "Big Skip" playback function using genre based relationships is illustrated in FIG. 12. First, the "Big Skip" playback function logic is invoked by the user via the device's existing user interface 1200. Next, the currently playing artist is mapped to a genre 1201. In one embodiment, the currently playing artist is mapped to a genre using an artist to genre map. For example, the artist to genre mapping can come from the central music database and may be stored a part of the artist relationship graph. Thus, for each artist in the graph, a genre is also stored. The genre for the current artist is now called the current genre.

For each genre, a score is calculated based on the strength of the relationship between itself and the current genre. When a genre score has been calculated 1205, the genre/score pair is added 1206 to a selection list. This process (1202-1206) continues until all the genres have been scored and added into the selection list. Thus, the algorithm loops on all genres related to the Current Genre. In one embodiment, the genre relationships are obtained from the centralized music information server's relationship database along with the artist relationships.

In one embodiment, for "Big Skip" playback functions, the score 9 is related to the inverse of the relationship strength. That is, similar genres yield smaller scores resulting in less probability of selection. One such scoring is to take the relationship rank as the score, or 1000 if there is no relationship between the genres. Many other methods of calculating score are possible. In another embodiment, for "Medium Skip" playback functions based on genre, the selection may be heavily biased towards the related genres. In other words, the inverse of the "Big Skip" scoring method can be used: 1.0/relationship rank.

Once all genres have been scored 1205 and added 1206 the selection list, a genre is selected from the selection list 1209 with the probability of selection equal to the genre score divided by the sum of all scores of genres added to the selector. If there are no eligible genres, the selection list will be empty 1207 and a 'No More Tracks' status is returned 1208.

Once a genre has been selected 1209, an artist and track are selected for the genre 1210. An exemplary embodiment of selecting an artist and track for the genre 1210 is depicted in further detail in FIG. 13. If an artist/track cannot be selected for the genre 1211, the genre is marked as exhausted 1213 and is removed 1214 from the selection list. The genre selection is retired until a track is found 1212 or all genres are exhausted.

Figure 13:
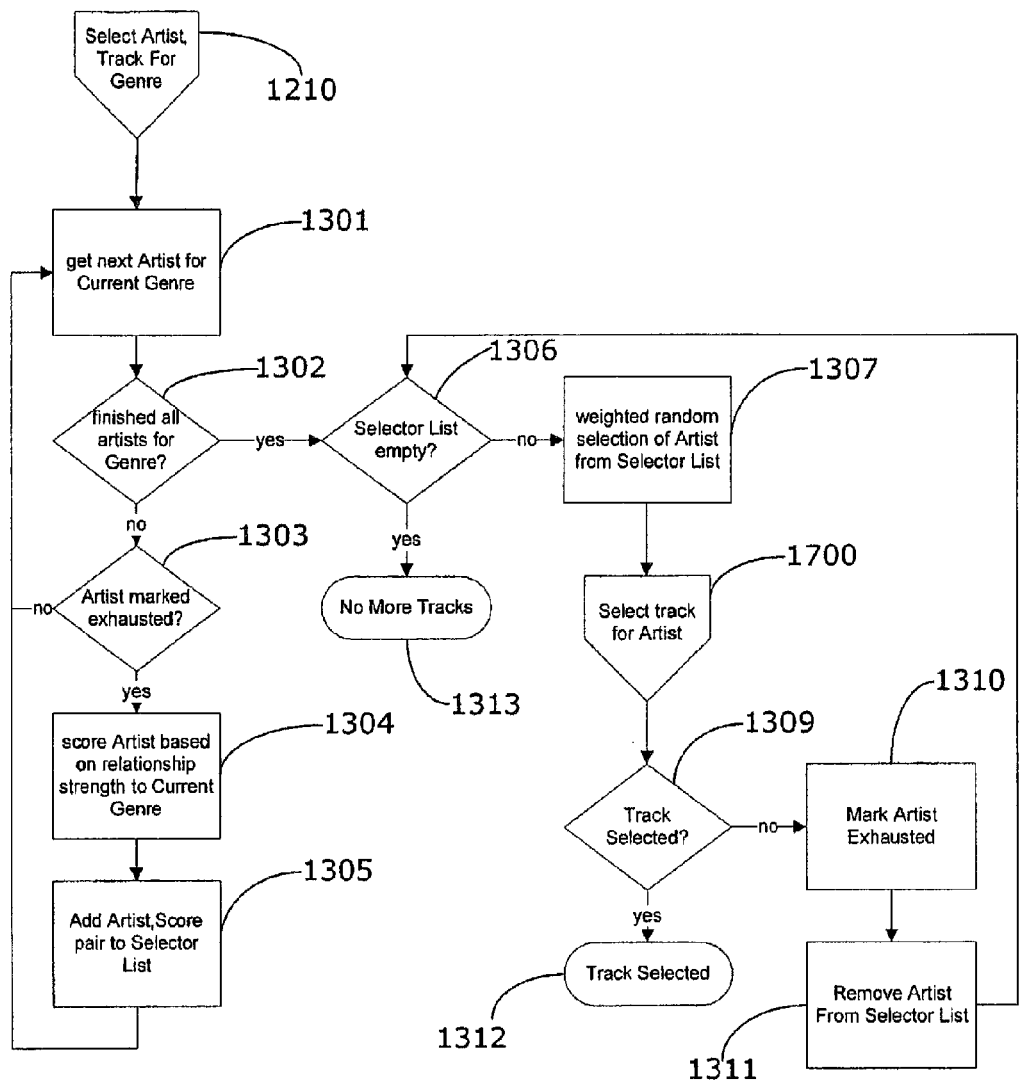
FIG. 13 is a flowchart illustrating an exemplary embodiment of the track selection logic supporting a big skip playback function using genre-based relationships.

FIG. 13 depicts an exemplary embodiment of selecting and artist and track once the genre has been selected as depicted in FIG. 12. Specifically, FIG. 13 illustrates exemplary logic supporting the artist and track selection in a "Big Skip" playback function using genre based relationships.

In one embodiment, each artist is scored 1304 based on its 'fit' to the current genre. In one embodiment, 'fit' is based on the size of the intersection of the set of artists in the genre and the set of artists comprising the related artists for the given artist. In an alternate embodiment, the score is based on artist popularity scaled by the 'fit' metric.

When an artist score has been calculated 1304, the artist/score pair is added 1305 to a selection list. This process (1301-1305) continues until all the artists have been scored and added to the selector list. In other words, the algorithm loops over all artists associated with the selected Genre.

Once all eligible artists have scored 1304 been added to the Selector List 1305, an artist is selected 1307 such that the probability of selection is equal to the artist score divided by the sum of all scores of artists added to the selector list.

Once an artist is selected 1307, the track is selected 1700 for the artist as described previously and depicted in FIG. 17. If there are no eligible tracks for the artist 1309, the artist is marked as exhausted 1310, removed 1311 from the selector or selection list, and a new artist is selected. If all eligible artists are exhausted 1306, the No More Tracks' status is returned 1313.

Thus, in one embodiment, the user can select a media file by invoking a series and combination of playback functions as described above. In other words, when the user invokes a number of playback functions, through a user input, the user is selecting a media file based on a first media file and the playback function which represents a relationship measure between the first media file and the media file to be selected. Thus, the user can move through a plurality of media files in designated increments, depending on the playback function invoked, with each step related to the previous step.

Figure 3:
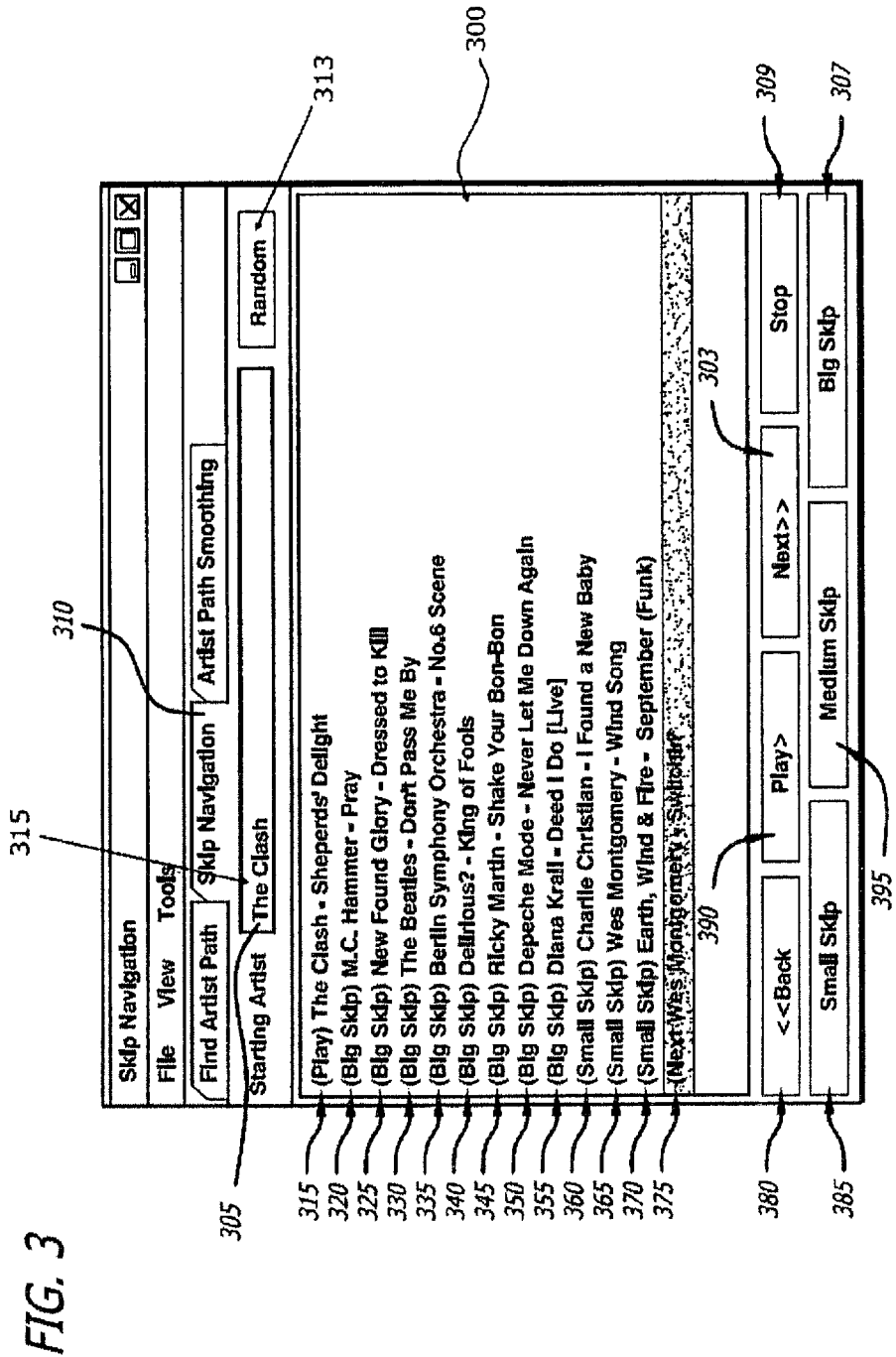
FIG. 3 illustrates a navigation path of an exemplary embodiment.

FIG. 3 illustrates an exemplary embodiment of a selection engine's interface which shows the navigation path of a session constrained to the contents of a local library consisting of about 2000 media files. Artist based relationships are used for small skips as described in FIGS. 16-17. Genre based relationships are used for medium and big skips as described in FIGS. 12 and 13. As stated above, in one embodiment, the device keeps track of what has been played and skipped, and avoids repeating tracks. As can be seen in FIG. 3, a tab 310 with a large window pane 300 is displayed with a text box 305 denoting a starting artist 315 a button with the word "Random" 313, a "Back" button 380, a "Play" button 390 a "Next" button 303, a "Stop" button 309, a "Small Skip" button 385, a "Medium Skip" button 395, and a "Big Skip" button 307. In FIG. 3, the window pane 300 includes lists of artists and associated tracks (Items numbered 315-375). Within this list, a playback function is denoted in parentheses before each artist entry. Thus, the list of artists in the window pane shows not only the artist's name and media file title relative to the starting artist 315, but also the associated playback function invoked by the user prior resulting in the selection of that media file. Accordingly, the window pane 300 shows the navigation path of the particular session. Meaning, the order and selection of playback functions the user invoked and what media files that were selected in a particular session.

For example, as in FIG. 3, The Clash is the starting artist 315. As can be seen in the window pane 300, The Clash is listed 315, and in parentheses the term "Play" appears before it, denoting that The Clash is the first artist selected when the user initiated the playback function or the user input session by pressing the "Play" button. The next playback function invoked by the user was a "Big Skip" playback function 307, which selected the artist M.C. Hammer and the track "Pray 320". In other words, the user selected a "Big Skip" playback function, meaning that the user desired the next media file's artist to be dissimilar from the currently playing artist, The Clash 315. Accordingly, as can be seen in FIG. 3, M.C. Hammer 320 was selected, a dissimilar artist relative to the Clash 315.

Next, the user invoked a series of several "Big Skip" playback functions 320-355, each rendering a media file which had a dissimilar artist with respect to the previous media file.

In another example, Diana Krall, "Deed I Do" 355 was the currently playing artist and track. Then, the user invoked the "Small Skip" playback function and the artist Charlie Christian and track "I found a new baby" 360 was selected. Thus, by invoking the "Small Skip" playback function, the user was able to move from one artist to a somewhat similar artist.

Figure 10:
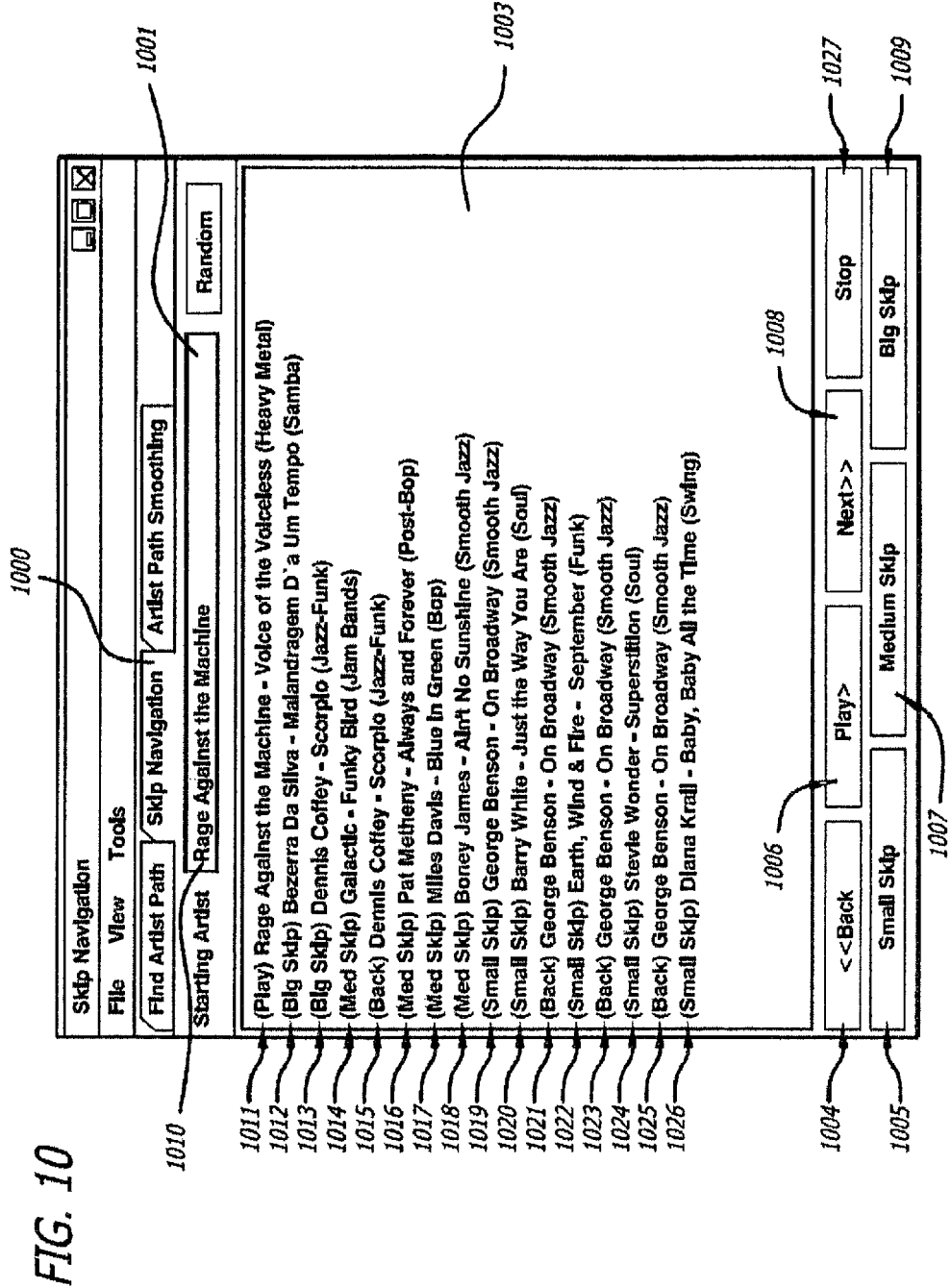
FIG. 10 illustrates a navigation path of an exemplary embodiment.

Similarly, FIG. 10 illustrates a sessions' navigation when constrained to a large streaming service catalog containing several hundred thousand tracks. In one embodiment, artist based relationships may be used for small skips as described in FIGS. 16-17 and genre based relationships are used for medium and big skips as described in FIGS. 12-13.

As can be seen in FIG. 10, a tab 1000 with a large window pane 1003 is displayed with a text box 1001 denoting a starting artist 1010, a "Back" button 1004, a "Play" button 1006, a "Next" button 1008, a "Stop" button 1027, a "Small Skip" button 1005, a "Medium Skip" button 1007, and a "Big Skip" button 1009.

In FIG. 10, a window pane 1003 includes lists of artists and associated tracks (Items numbered 1011-1026) in a session. As can be seen in FIG. 10, the session began with Rage against the machine 1010 as the starting artist. Next, the user invoked a "Big Skip" playback function and the artist Bezerra Da Silva and the Malandragem Da um Tempo 1012 track media file was selected. In other words, as can be seen by the navigation list in window pane 1003, the currently playing artist was Rage Against the Machine 1010, then the user, desiring a dissimilar genre, invoked a "Big Skip" playback function which selected the artist (using logic as depicted in FIGS. 12-13) and track in a dissimilar genre with respect to the currently playing artist. Specifically, the currently playing media file 1011 was under the heavy metal genre and a "'Big Skip" playback function selected a media file in a dissimilar genre, Salsa 1012. As can be seen in FIG. 10, the user continued to select media files based using "Big Skip", "Medium Skip", and "Small Skip" playback functions that selected the next media file based on a level of similarity based on genres with respect to the currently playing or paused media file. For example, in one embodiment, Miles Davis, Blue in Green 1017 a media file in the Bop genre, was the currently playing media file, then, the user invoked the "Medium Skip" playback function which selected Boney James, Ain't No Sunshine 1018, which is under the Smooth Jazz genre. Thus, by invoking the "Medium Skip" playback function the user was able to move from the Bob category to a somewhat similar category, Smooth Jazz.

Thus, the user can navigate and hone in on particular media file using a series and combination of playback functions. The user does not need to know in advance which particular file is desired, but can request and select media files using the playback functions to choose media files that are highly similar, somewhat similar, or dissimilar from the currently playing or paused media file. In one embodiment, the user can select a media file with a simple interface. However, in further embodiments, the feedback can be principally auditory. Thus, the present disclosure is well suited for use in an automobile. Furthermore, in such settings, the user can select a media file and invoke playback functions through a remote control or fob.

In a further embodiment, a user can further shape or customize the relationship data through one or more settings. In one embodiment, the user can set these settings before creating the relationship data and/or loading the relationship data onto a device. Thus, the settings will be applied during the creation and loading of the relationship data. In another embodiment, these settings can have default criteria.

In one embodiment, the user can specify these settings through a property sheet available on the device's user interface, as a software plug-in tool, or as any other graphical user interface which allows the user to select and specify one or more settings.

One exemplary embodiment of a setting is a focus setting. For example, the focus setting may be represented on a user interface as a slider or a series of radio buttons, a dial, a drop down menu, or any other visual representation of a setting. In one aspect, the focus setting biases the selection of media files relative to the currently playing media file. For example, the focus slider could bias the selection of media files relative to the currently playing artist, album, or track. Meaning, the focus setting determines the approximate probability that the next media file will be the most strongly associated item to the current playing artist, album or track. For example, the focus setting could have a range of 0-100. The 100 setting denotes that media files will be chosen largely in the order of their relationship strength to the currently playing media file will be selected. For example, if the currently playing artist is the Rolling Stones, and the focus setting is set at 100, then the only media files from the Rolling Stones will be selected.

Similarly, a 0 setting denotes that the media files related to (but not the same as) the currently playing media file will be selected. For example, again, if the currently playing artist is the Rolling Stones and the focus setting is set at 0, then only media files with artists which are related to the Rolling Stones will be selected.

Another exemplary embodiment of a setting is a popularity setting. Again, through a user interface, the popularity setting can take many forms such as, but not limited to, a slider, a dial, a series of radio buttons, and/or a drop down menu. In one embodiment, the popularity setting biases the selection of media files relative to the currently playing or paused media file. The 100 setting denotes that the most popular tracks relative to the currently playing media file will be chosen. Again, in one embodiment, the media file selection with respect to the currently playing media file can have a relationship set based on artist relationships, album relationships, genre, and/or era relationships.

In one embodiment, the popularity is based upon relationship or affinity data between media files. In one embodiment, where the media file selection is based on artist relationships, the popularity setting determines the track or media selection related to a particular artist.

The popularity attribute of a particular track or media file can be based and gathered from several sources such as implicit and explicit user behavior or ratings and/or implicit and explicit data collected from a large group of users. One example of implicit user behavior or input is the frequency of play for a particular media file by the user. Thus, the frequency of play can be used to determine the popularity attribute. One example of explicit user data is a rating which the user applies to a track or media file. For example, a rating system can be based on a 1 to 5 star scale where 1 star denotes a low or disfavorable rating, 3 stars denote a mid or favorable rating, and 5 stars denote a high or very favorable rating. In one embodiment, when data is collected from a large group of users, the aggregate popularity data is normalized to a 1 to 5 star ranking. The tracks can be ranked relative to each other. For example, the top 10% media files are those media files with a 5 star rating. The next 15% media files are a 4 star rating. The middle 50% are a 3 star rating. The following 15% media files are a 2 star rating, and the bottom 10% media files are a 1 star rating.

Figure 15:
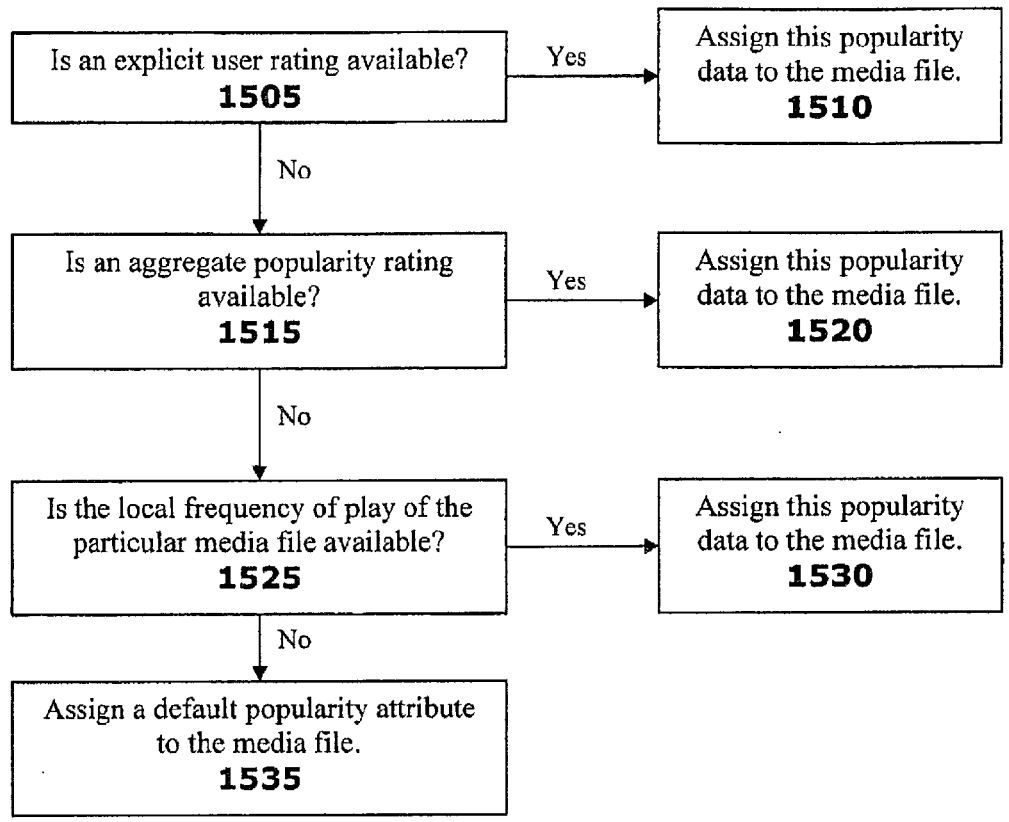
FIG. 15 is a flowchart illustrating for determining the popularity attribute of an exemplary embodiment.

In one embodiment, the system determines the popularity attribute from a hierarchical process using the available data. An exemplary process for determining the popularity attribute of each media file is depicted in FIG. 15. This process ensures that each media file is assigned a popularity rating. In FIG. 15, the system determines 1505 if an explicit user rating is available for the particular media file. An explicit user rating may be rating consciously applied to a media file by a user. If an explicit user rating is available, then the system assigns 1510 this rating to the particular media file. If an explicit user rating is not available, then the system determines 1515 if aggregate popularity gathered from a large number of users is available 1515. In one embodiment, "a large number of users" can refer to the users in an on-demand, streaming music service or a similar online community. If an aggregate popularity attribute is available, then the system assigns 1520 this attribute or rating to the media file. If aggregate popularity data from a large number of users is not available, then the system determines 1525 whether popularity attributes based on the users' frequency of play is available 1525. If this data is available, the system assigns 1530 this popularity attribute or rating to the media file. If the frequency of play popularity attribute is not available, then the system assigns 1535 a default popularity attribute or rating to the media file 1535. For example, the default popularity attribute could be an average rating such as a 3.0 on a 1 to 5 star rating scale.

Once every media file is assigned a popularity attribute, the position of setting of the popularity setting is used to determine the appropriate scoring function. For example, Table 1 below illustrates an exemplary table which associates popularity settings with a scoring function. In this table, probabilities are shown assuming 10% of the population is 5 star, 15% is 4 star, 15% is 2 star, and 10% is 1 star.

TABLE 1

| Slider position | Scoring Function f(n) | Chance of 1 star | Chance of 2 star | Chance of 3 star | Chance of 4 star | Chance of 5 star |
|---|---|---|---|---|---|---|
| N/A | $1/n^2$ | 99.5% | 0.24% | 0.20% | 0.06% | 0.01% |
| <15 | 1/nlogn + filter | 96% | 4% | 0 | 0 | 0 |
| 15-29 | 1/nlogn | 90% | 3.5% | 5% | 1% | .5% |
| 30-44 | 1/n | 84% | 5% | 8% | 1.7% | .8% |
| 45-54 | Flat | 10% | 15% | 50% | 15% | 10% |
| 55-69 | Nlogn | .1% | 8% | 50% | 22% | 20% |
| 70-84 | $n^2$ | ~0% | 4% | 39% | 26% | 31% |
| 85-100 | $N^2$ + filter | 0 | 0 | 0 | 45% | 65% |

Similarly, the 0 setting denotes that the least popular tracks will be selected. This allows the user to play less commonly known media files from the area of the particular playlist center (artist, album, track, genre, and/or era).

Accordingly, focus and popularity settings have selectors ranging in between the 0 and 100 settings. For example, in an embodiment based on artist relationships, if the focus setting is set to 75, the system will choose media files from the currently playing artist 75% of the time and will choose media files from related artists (relative to the currently playing artist) 25% of the time.

Furthermore, in one embodiment, the user can select settings in both the focus and popularity settings. This allows the user to shape or customize the media files available for selection based on a specified level of popularity and diversity with respect to the currently playing media files.

Figure 18:
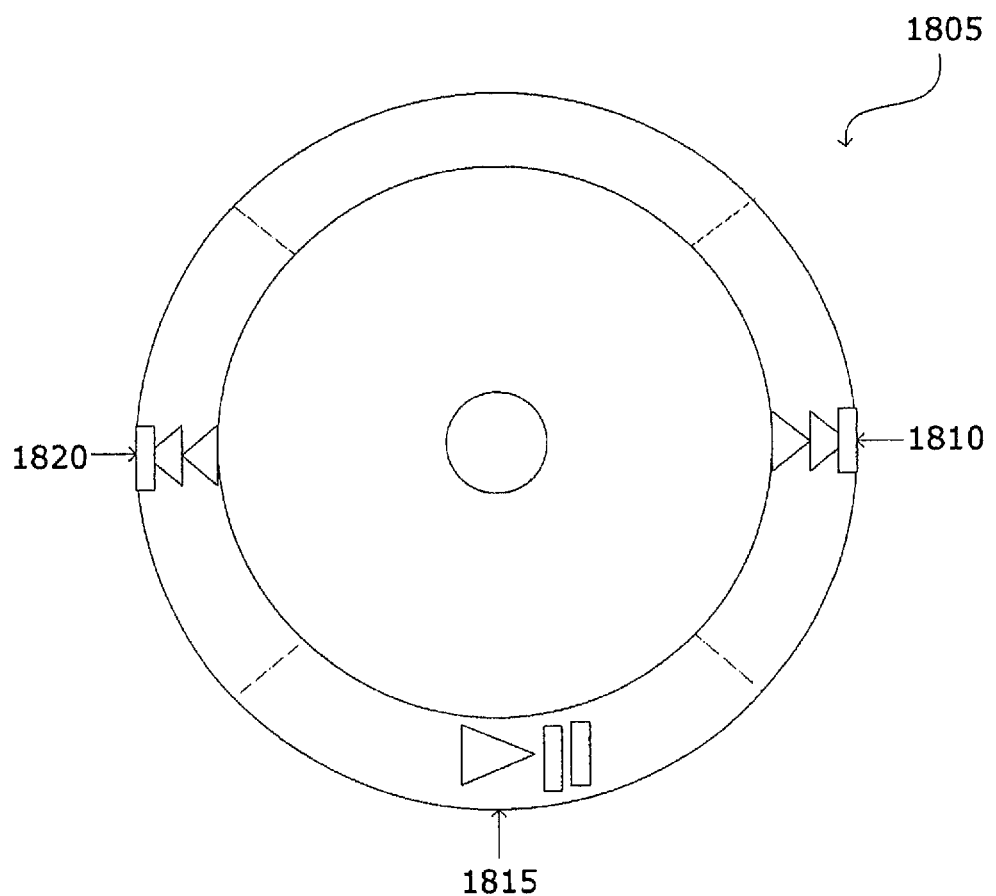
FIG. 18 illustrates a user interface of an exemplary embodiment.
Figure 19:
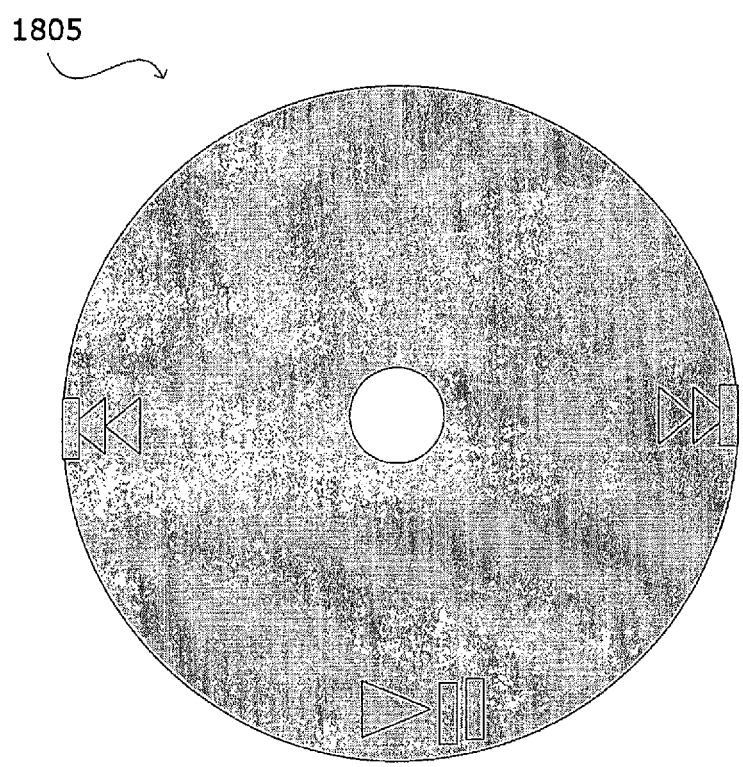
FIG. 19 illustrates a user interface of an exemplary embodiment.

As stated above, once relationship data is created and/or loaded onto a device, the user can invoke any number of playback functions. Generally, the user invokes these playback functions by a user input or using the device's existing user interface. For example, in one embodiment, each playback function is associated with a button, key, dial, switch, touch screen, or key pattern of the device's user interface. For example, FIG. 18 depicts an user interface of one exemplary embodiment. As can be seen in FIG. 18, the user interface comprises of a wheel or dial 1805 with a fast forward icon 1810, a rewind icon 1820, and a pause, play, or stop icon 1815. FIG. 19 depicts another wheel or dial user interface 1805 of another exemplary embodiment with similar icons.

In another example, most media rendering devices contain a fast forward icon a rewind icon and a play or pause icon. FIG. 20 depicts one exemplary embodiment of icons that may be used to invoke a playback function. As can be seen in FIG. 20, FIG. 20a depicts a rewind icon, FIG. 20b depicts a fast forward icon, and FIG. 20c depicts a pause or play icon. Thus, in one example, the "Next" playback function can be invoked by pressing the fast forward button (FIG. 20b) once, the "Small Skip" playback function can be invoked by double-clicking the Fast Forward (FIG. 20b) button twice rapidly; and the "Big Skip" playback function can be invoked by pressing down the fast forward button (FIG. 20b) for at least one second and then letting go. Thus, once the relationship is created and/or loaded onto the device, the user is able to selecting a media file based on a desired relationship measure, a user input, relationship data, and the identity of a media file using the device's existing user interface.

It is important to note that the present disclosure is not dependent on a particular implementation of the user interface element for skipping and invoking playback functions.

Nor is it dependent on exactly two magnitudes of skip as described as Small Skip and Big Skip. For example, if the portable device has a wheel or dial base scroll mechanism, an appropriate implementation of the present disclosure might be to map the speed or distance traveled by the wheel or dial scroll to the magnitude of a skip performed. One exemplary embodiment of a dial based user interface is depicted in FIGS. 18 and 19. In other words, the user can perform the "Next", "Small Skip", and "Big Skip" playback functions on a currently-playing or paused track or media file by correlating these interactive functionalities to a specific turn or speed of turn of the wheel or dial. For example, if the user moves the wheel or dial in 45 degrees in a certain direction that could be correlated with the "Next" playback function. Thus, when the user moves the dial 45 degrees the user is signaling that he or she wishes to play a track or media file closely related to the currently-playing media file. Furthermore, a 90 degree turn of the dial to correlate to the "Small Skip" playback function. Thus, when the user turns the scroll-based dial 90 degrees the user is signifying or signaling that the user wishes to select an artist that is somewhat related to the currently playing or paused artist. Finally, if the user wishes to invoke the "Big Skip" playback function, the user can turn the scroll-based dial 180 degrees. That will signal that the user wishes to select very different or not similar at all to the currently-playing artist.

Of course, the particular key, button, icon or dial associated with the playback functions will depend on the particular device. Indeed, a device with a single user input or incon element could be utilized, e.g. the entire user interface could comprise a skip button or icon.

As stated before, the method, device and system for selecting a media file based on a desired relationship measure, a user input, relationship data, and the identity of a media file on an external device encompasses not only portable music players and media files, but can also encompass video, DVDR, satellite or on-demand programming, and any other type of device capable of reproducing media. So in one embodiment, it could be applied to television programming so the effect is the pressing of certain correlated buttons on a remote will change and allow the user to select the next channel or program based on the relationship between programming. For example, in one exemplary embodiment applied to TV programming and video files, the list of programs is synchronized with the personal computer and then the personal computer sends this to the server. Again, the server initiates a list of relationships or relationship data among those programs. Those listed relationships can be based on genre, play date, play time, similar actors, similar channels, ratings. Once the server has created this list as relationship data among the media programs, it will send it back to the personal computer and then it can be loaded onto the on-demand video programming service. Next, the use can invoke playback functions by pressing particular buttons on the remote or any other user input. For example, if the user is watching a media program and hits the button which invokes the "Next" playback function, the channel will change to a television program which is very similar to the previous television program. Again, these playback functions will be invoked by buttons such as the FAST FORWARD button, the UP/DOWN button on a remote control, or any buttons located on the existing interface for the television program or on-demand programming device.

In further embodiments, it is contemplated that this relationship data is loaded onto devices with a minimal or basically no display, or where it is not practical for a user to select a media file through the display, such as an MP3 player or CD player in an automobile. Thus, it is contemplated that the control and selection of a media file, once loaded onto these types of devices, can be facilitated through voice command, a remote control, fob, which will have different keys corresponding to the playback functions, such as "Next", "Small Skip" or "Big Skip" or other types of playback functions such as "Yes", "No, But Close To", "No and Not Close To." For example, in a key-fob having at least one button, a possible mapping could be that pressing and holding the button invokes the playing function or a stop function if the playlist is currently playing. Pressing the button once could invoke the "Next" playback function and pressing the button twice could invoke the "Small Skip" playback function, three times "Big Skip" and so on.

In another example, such as an iPOd or a device with a similar key/buttons layout where the buttons point in a North, East, South, and West directions, each direction could correlate, be mapped to, or invoke a particular playback function. For example, pressing the North direction could invoke the "Big" playback function. Pressing the South direction could invoke the "Small Skip" playback function. Pressing the East direction could invoke the "Next" playback function. And pressing the West direction could invoke the "Back" playback function. Further, pressing the center could invoke the playlist to re-center on the current track.

Those skilled in the art will recognize that the method and system of the present invention within the application may be implemented in many manners and as such is not to be limited by the foregoing exemplary embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system component described herein as would be understood by those skilled in the art.

I claim:

1. A method, comprising:
   establishing a streaming media connection between a media server computing device and a streaming appliance computing device for streaming a first media object to the streaming appliance computing device for consumption by a user;
   obtaining a single-action user input at the media server computing device from the streaming appliance computing device while the first media object is streaming, the single action user input to indicate a desired relationship measure comprising a selected level of similarity between one or more attributes of the first media object and one or more attributes of individual media objects of a plurality of media objects, the single-action user input further indicating to select a second media object of the plurality of media objects for subsequent play;
   identifying the second media object for subsequent play in accordance with the desired relationship measure while the first media object is streaming at least in part in response to obtaining the single action user input, the first and second media objects having a relationship measure that satisfies the desired relationship measure; and
   initiating streaming of the second media object from the media server to the streaming appliance computing device.

2. An article, comprising: a non-transitory storage medium having stored thereon instructions executable by a media server computing device to:
   establish a streaming media connection between the media server computing device and a streaming appliance computing device to stream a first media object to the streaming appliance computing device for consumption by a user;
   obtain a single-action user input from the streaming appliance computing device while the first media object is streaming, the single action user input to indicate a desired relationship measure comprising a selected level of similarity between one or more attributes of the first media object and one or more attributes of individual media objects of a plurality of media objects, the single-action user input to further indicate to select a second media object of the plurality of media objects for subsequent play;
   identify the second media object for subsequent play in accordance with the desired relationship measure while the first media object is streaming at least in part in response to the obtaining the single action user input, the first and second media objects to have a relationship measure to satisfy the desired relationship measure; and
   initiate streaming of the second media object from the media server computing device to the streaming appliance computing device.

3. A media server computing device, comprising: one or more processors to:
   establish a streaming media connection between the media server computing device and a streaming appliance computing device to stream a first media object to the streaming appliance computing device for consumption by a user;

obtain a single-action user input from the streaming appliance computing device while the first media object is streaming, the single action user input to indicate a desired relationship measure to comprise a selected level of similarity between one or more attributes of the first media object and one or more attributes of individual media objects of a plurality of media objects, the single-action user input to further indicate to select a second media object of the plurality of media objects for subsequent play;

identify the second media object for subsequent play in accordance with the desired relationship measure while the first media object is streaming at least in part in response to the single action user input, the first and second media objects to have a relationship measure to satisfy the desired relationship measure; and initiate streaming of the second media object to the streaming appliance computing device.

4. The method of claim 1, further comprising initiating the streaming of the second media object at least in part by communicating a streaming identifier between the media server computing device and the streaming appliance computing device.

5. The method of claim 1, further comprising initiating the streaming of the second media object at least in part by communicating a streaming instruction between the media server computing device and the streaming appliance computing device.

6. The method of claim 1, wherein the media server computing device comprises separate central music relationship and streaming server computing devices.

7. The article of claim 2, wherein the storage medium has stored thereon further instructions executable by the media server computing device to initiate streaming of the second media object at least in part by communicating a streaming identifier between the media server computing device and the streaming appliance computing device.

8. The article of claim 2, wherein, to initiate streaming of the second media object, the storage medium having stored thereon further instructions executable by the media server computing device to communicate a streaming instruction between the media server computing device and the streaming appliance computing device.

9. The article of claim 2, wherein the media server computing device to comprise separate central music relationship and streaming server computing devices, wherein the central music relationship server computing device to comprise at least one processor, and wherein the streaming server computing device to comprise at least one processor.

10. The media server computing device of claim 3, wherein, to initiate the streaming of the second media object, communicate a streaming identifier between the media server computing device and the streaming appliance computing device.

11. The media server computing device of claim 3, wherein, to initiate the streaming of the second media object, the one or more processors of the media server to communicate a streaming instruction between the media server computing device and the streaming appliance computing device.

12. The media server computing device of claim 3, wherein the media server computing device to comprise separate central music relationship and streaming server computing devices, wherein the central music relationship server computing device to comprise one or more processors, and wherein the streaming server computing device to comprise one or more processors.

13. The method of claim 6, wherein the central music relationship server computing device identifies the second media object in accordance with the desired relationship measure.

14. The method of claim 6, wherein a streaming identifier is communicated between the central music relationship server computing device and the streaming appliance computing device at least in part in response to the identifying the second media object.

15. The article of claim 9, wherein the storage medium having stored thereon further instructions executable by the central music relationship server computing device to identify the second media object in accordance with the desired relationship measure.

16. The article of claim 9, wherein the storage medium having stored thereon further instructions executable by the central music relationship server computing device to communicate a streaming identifier between the central music relationship server computing device and the streaming appliance computing device at least in part in response to the identification of the second media object.

17. The media server computing device of claim 12, the one or more processors of the central music relationship server computing device to identify the second media object in accordance with the desired relationship measure.

18. The method of claim 14, wherein the streaming server computing device obtains the streaming identifier from the streaming appliance computing device and initiates the streaming of the second media object between the streaming server computing device and the streaming appliance computing device.

19. The article of claim 16, wherein the storage medium having stored thereon further instructions executable by the streaming server computing device to obtain the streaming identifier from the streaming appliance computing device and to stream the second media object to the streaming appliance computing device.

20. The media server computing device of claim 17, the one or more processors of the central music relationship server computing device to communicate a streaming identifier between the central music relationship server computing device and the streaming appliance computing device at least in part in response to the identification of the second media object, the one or more processors of the streaming server computing device to obtain the streaming identifier from the streaming appliance computing device and to initiate the streaming of the second media object to the streaming appliance computing device.

* * * * *